(12) United States Patent
El-Kady et al.

(10) Patent No.: US 9,709,720 B2
(45) Date of Patent: Jul. 18, 2017

(54) BIANISOTROPIC METAMATERIAL

(71) Applicant: National Technology & Engineering Solutions of Sandia, LLC, Albuquerque, NM (US)

(72) Inventors: Ihab F. El-Kady, Albuquerque, NM (US); Charles M. Reinke, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 151 days.

(21) Appl. No.: 14/594,998

(22) Filed: Jan. 12, 2015

(65) Prior Publication Data

US 2015/0192721 A1      Jul. 9, 2015

Related U.S. Application Data

(62) Division of application No. 12/956,183, filed on Nov. 30, 2010, now abandoned.

(60) Provisional application No. 61/294,221, filed on Jan. 12, 2010.

(51) Int. Cl.
    *G02B 5/30*      (2006.01)
    *G02B 1/00*      (2006.01)
    *H01Q 15/00*     (2006.01)

(52) U.S. Cl.
    CPC ........... *G02B 5/3083* (2013.01); *G02B 1/002* (2013.01); *H01Q 15/0086* (2013.01)

(58) Field of Classification Search
    CPC . G02B 1/002; H01C 15/0086; H01Q 15/0086
    USPC .......................................................... 359/352
    See application file for complete search history.

(56) References Cited

U.S. PATENT DOCUMENTS

| | | | |
|---|---|---|---|
| 7,525,711 B1 | 4/2009 | Rule et al. | |
| 7,532,397 B2 | 5/2009 | Tanaka et al. | |
| 7,538,946 B2 | 5/2009 | Smith et al. | |
| 7,593,170 B2 | 9/2009 | Wu et al. | |
| 8,271,241 B2 | 9/2012 | Akyurtlu et al. | |
| 2007/0237478 A1* | 10/2007 | D'Aguanno | B82Y 20/00 385/129 |
| 2009/0262766 A1* | 10/2009 | Chen | H03C 7/027 372/26 |
| 2012/0212375 A1 | 8/2012 | Depree, IV | |

(Continued)

OTHER PUBLICATIONS

O. Isik et al., Analysis of Spiral Metamaterials by Use of Group Theory, Metamaterials 3 (2009), pp. 33-43.

(Continued)

*Primary Examiner* — Thomas K Pham
*Assistant Examiner* — Mitchell Oestreich
(74) *Attorney, Agent, or Firm* — Kevin W. Bieg

(57) ABSTRACT

The topology of the elements of a metamaterial can be engineered from its desired electromagnetic constitutive tensor using an inverse group theory method. Therefore, given a desired electromagnetic response and a generic metamaterial elemental design, group theory is applied to predict the various ways that the element can be arranged in three dimensions to produce the desired functionality. An optimizer can then be applied to an electromagnetic modeling tool to fine tune the values of the electromagnetic properties of the resulting metamaterial topology.

4 Claims, 34 Drawing Sheets

(56) References Cited

U.S. PATENT DOCUMENTS

2012/0280872 A1* 11/2012 Werner .............. H01Q 15/0053
343/753

OTHER PUBLICATIONS

N. Wongkasem et al., Group Theory Based Design of Isotropic Negative Refractive Index Metamaterials, Progress in Electromagnetics Research, Pier 63, (2006), pp. 295-310.
C.M. Reinke et al., Group-Theory Approach to Tailored Electromagnetic Properties of Metamaterials: An Invers- Problem Solution, Physical Review E 83 (2011), pp. 066603-01-066603-18.
K.B. Alici et al., Radiation properties of a split ring resonator and monopole composite, Phys. stat. sol., (b) 244, No. 4 (2007), pp. 1192-1196.
G.P. Bava, General Form of the Reciprocity Relationship for Bianisotropic Media, Electronics Letters, Jul. 12, 1968, vol. 4, No. 14, pp. 299-300.
C.Enkrich et al., Magnetic Metamaterials at Telecommunication and Visible Frequencies, PRL 95 (2005), pp. 203901-4-203901-1.
N. Katasarakis et al., Electric coupling to the magnetic resonance of split ring resonators, Applied Physics Letters, vol. 84, No. 15, Apr. 12, 2004, pp. 2943-2945.
M.W. Klein et al., Single-slit split-ring resonators at optical frequencies: limits of size scaling, Optic Letters, vol. 31, No. 9, May 1, 2006, pp. 1259-1261.
R. Marques et al., Role of bianisotropy in negative permeability and left-handed metamaterials, Physical Review B, vol. 65 (2002), pp. 144440-1-144440-6.
W.J. Padilla, Group theoretical description of artificial electromagnetic metamaterials, Optics Express, Feb. 19, 2007, vol. 15, No. 4, pp. 1639-1646.
J.B. Pendry et al., Magnetism from Conductors and Enhanced Nonlinear Phenomena, IEEE Transactions on Microwave Theory and Techniques, vol. 47, No. 11, Nov. 1999, pp. 2075-2084.
J.B. Pendry, Negative Refraction Makes a Perfect Lens, Physical Review Letters, vol. 85, No. 18, Oct. 30, 2000, pp. 3966-3969.
J.B. Pendry et al., Controlling Electromagnetic Fields, Science, 23, Jun. 2006, vol. 312, pp. 1780-1782.
R.A. Shelby et al., Experimental Verification of a Negative Index of Refraction, Science, New Series, vol. 292, No. 5514 (Apr. 6, 2001), pp. 77-79.
D.R. Smith et al., Composite Medium with Simultaneously Negative Permeability and Permittivity, Physical Review Letters, vol. 84, No. 18, May 1, 2000, pp. 4184-4187.
D.R. Smith et al., Metamaterials and Negative Refractive Index, Science, vol. 305, Aug. 6, 2004, No. 5685, pp. 788-792.
V.G. Veselago, The Electrodynamics of Substances with Simultaneously Negative Values of • and μ, Soviet Physics Uspekhi, vol. 10, No. 4, Jan.-Feb. 1968, pp. 509-514.
X. Xu, Bianisotropic Response of Microfabricated Metamaterials in the Terahertz Region, J. Opt. Soc. Am. B, vol. 23, No. 6, Jun. 2006, pp. 1174-1180.

* cited by examiner $$\bar{\bar{c}} = \begin{bmatrix} \varepsilon_{xx} & \varepsilon_{xy} & \varepsilon_{xz} & \xi_{xx} & \xi_{xy} & \xi_{xz} \\ \varepsilon_{yx} & \varepsilon_{yy} & \varepsilon_{yz} & \xi_{yx} & \xi_{yy} & \xi_{yz} \\ \varepsilon_{zx} & \varepsilon_{zy} & \varepsilon_{zz} & \xi_{zx} & \xi_{zy} & \xi_{zz} \\ \zeta_{xx} & \zeta_{xy} & \zeta_{xz} & \mu_{xx} & \mu_{xy} & \mu_{xz} \\ \zeta_{yx} & \zeta_{yy} & \zeta_{yz} & \mu_{yx} & \mu_{yy} & \mu_{yz} \\ \zeta_{zx} & \zeta_{zy} & \zeta_{zz} & \mu_{zx} & \mu_{zy} & \mu_{zz} \end{bmatrix}$$

- Coupled Linear Oscillations $(r_i, r_j)$
- Coupled Linear/axial Motions $r_i, R_j$
- Coupled Linear/axial Motions $r_i, R_j$
- Coupled Axial motion $(R_i, R_j)$ $$\bar{\bar{c}} = \begin{bmatrix} \varepsilon_{xx} & 0 & 0 & 0 & 0 & 0 \\ 0 & \varepsilon_{yy} & 0 & 0 & 0 & 0 \\ 0 & 0 & \varepsilon_{zz} & 0 & 0 & 0 \\ 0 & 0 & 0 & \mu_{xx} & 0 & 0 \\ 0 & 0 & 0 & 0 & \mu_{yy} & 0 \\ 0 & 0 & 0 & 0 & 0 & \mu_{zz} \end{bmatrix}$$

- Independent Linear Oscillations $r_i$'s
- Independent Axial motion $R_i$'s

FIG. 7

| $D_2$ | E | $C_2(z)$ | $C_2(y)$ | $C_2(x)$ | linear functions, rotations |
|---|---|---|---|---|---|
| A | +1 | +1 | +1 | +1 | — |
| $B_1$ | +1 | +1 | −1 | −1 | z, $R_z$ |
| $B_2$ | +1 | −1 | +1 | −1 | y, $R_y$ |
| $B_3$ | +1 | −1 | −1 | +1 | x, $R_x$ |

| $D_{2h}$ | E | $C_2(z)$ | $C_2(y)$ | $C_2(x)$ | | $\sigma(xy)$ | $\sigma(xz)$ | $\sigma(yz)$ | linear functions, rotations |
|---|---|---|---|---|---|---|---|---|---|
| $A_g$ | +1 | +1 | +1 | +1 | +1 | +1 | +1 | +1 | – |
| $B_{1g}$ | +1 | +1 | −1 | −1 | +1 | +1 | −1 | −1 | $R_z$ |
| $B_{2g}$ | +1 | −1 | +1 | −1 | +1 | −1 | +1 | −1 | $R_y$ |
| $B_{3g}$ | +1 | −1 | −1 | +1 | +1 | −1 | −1 | +1 | $R_x$ |
| $A_u$ | +1 | +1 | +1 | +1 | −1 | −1 | −1 | −1 | – |
| $B_{1u}$ | +1 | +1 | −1 | −1 | −1 | −1 | +1 | +1 | z |
| $B_{2u}$ | +1 | −1 | +1 | −1 | −1 | +1 | −1 | +1 | y |
| $B_{3u}$ | +1 | −1 | −1 | +1 | −1 | +1 | +1 | −1 | x |

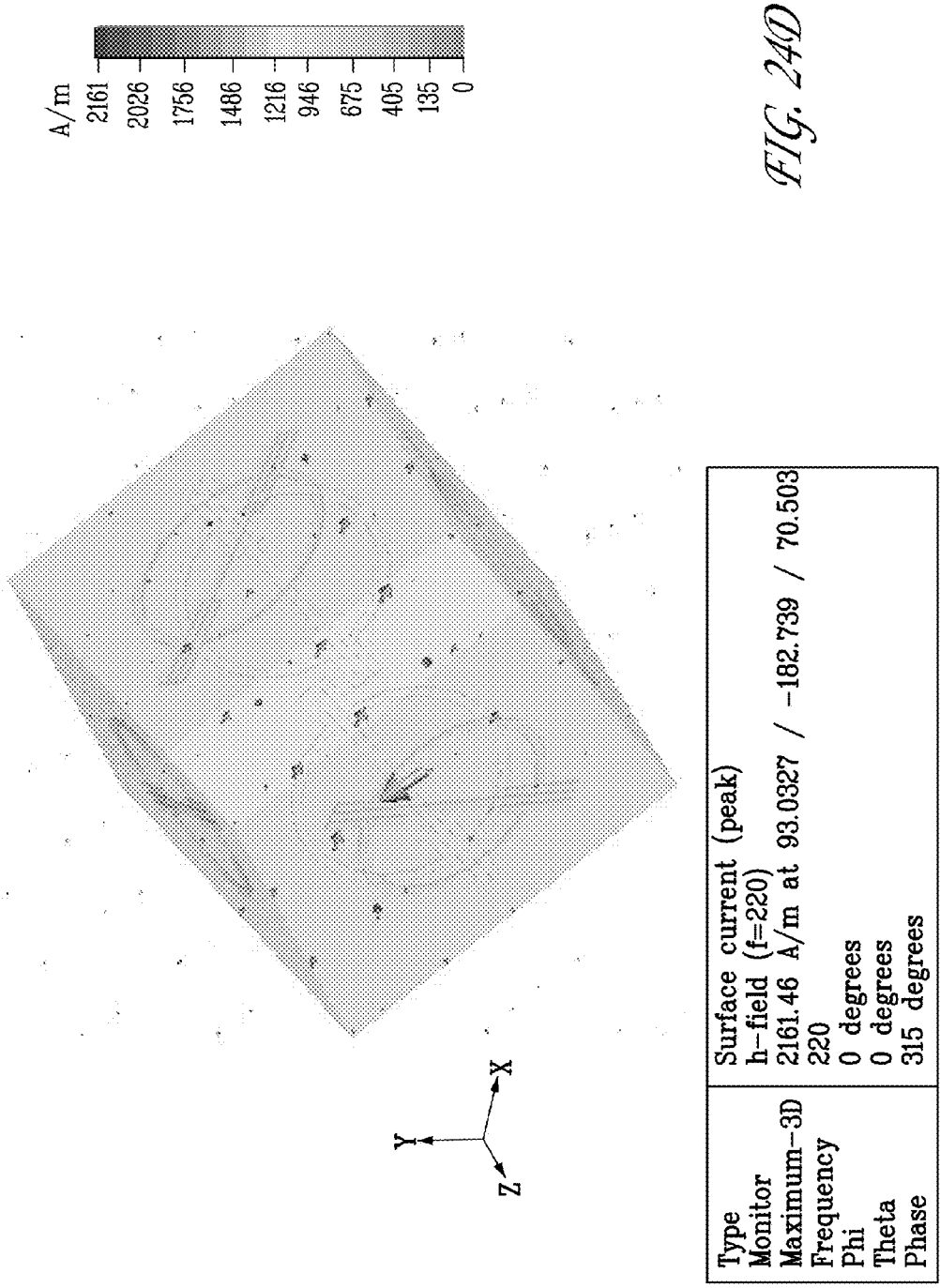

BIANISOTROPIC METAMATERIAL

CROSS-REFERENCE TO RELATED APPLICATION

This application is a divisional of co-pending U.S. application Ser. No. 12/956,183, filed Nov. 30, 2010, which claims the benefit of U.S. Provisional Application No. 61/294,221, Jan. 12, 2010, both of which are incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to metamaterials and, in particular, to metamaterials with tailorable electromagnetic properties and a method to design such metamaterials.

BACKGROUND OF THE INVENTION

During the last few years, metamaterials have received significant attention in research due to their anomalous electromagnetic properties and, hence, their potential for unique applications. See R. A. Shelby et al., *Science* 292 (5514), 77 (2001). In 1968, Veselago proposed a particular class of metamaterials, referred to as a left-handed metamaterial, which had several unusual properties, phase and energy flux of opposing sign, a negative index of refraction, reversal of the Doppler effect, and flat lens focusing. See V. G. Veselago, *Soviet Physics—Uspekhi* 10 (4), 509 (1968). More generally, a metamaterial is any artificial material that exhibits electromagnetic properties that are not necessarily displayed by the constituent elements. This is primarily due to resonant effects arising from the periodic orientation of the individual elements, which are typically sub-wavelength in size. Thus, electromagnetic metamaterials can theoretically exhibit any value of permittivity or permeability near the resonance frequency, including negative values. This prospect has led to the proposal of applications ranging from superlenses and the enhancement of antenna systems, to arguably even electromagnetic cloaking. See J. B. Pendry, *Physical Review Letters* 85 (18), 3966 (2000); K. B. Alici and E. Özbay, *Physica Status Solidi B* 244 (4), 1192 (2007); and J. B. Pendry et al., *Science* 312 (5781), 1780 (2006).

Despite the growing body of work involving metamaterials, little consensus has emerged regarding the optimal structure for producing a given set of electromagnetic properties, although a few general design templates such as the split-ring resonator (SRR) have become popular, largely due to their relative ease of fabrication. See J. B. Pendry et al., *IEEE Transactions on Microwave Theory and Techniques* 47 (11), 2075 (1999). The SRR element can be used to achieve a negative permeability in the vicinity of a magnetic resonance frequency. As shown in FIG. 1, the simplest form of the SRR 10 is a planar metallic ring 11 with a gap 12. The ring 11 has an outer dimension l and a metal linewidth w. The gap 12 has a width g. In essence, the SRR 10 is a small LC circuit consisting of an inductance L and a capacitance C. The ring 11 forms one winding of a coil (the inductance), and the ends at the gap 12 form the plates of a capacitor. Electromagnetic radiation directed into the plane of the SRR (i.e., in the z direction) induces a ring current I in the ring. Metamaterials comprise an array of such subwavelength metallic resonator elements within or on an electrically insulating or semiconducting substrate. Dense packing of SRRs, using lattice constants smaller than the LC resonance wavelength, creates a metamaterial that can exhibit a magnetic and electric resonance at the resonant frequency, $\omega_{LC}=1/\sqrt{LC}$. Two resonances are observed when exciting the SRR structure shown with incident radiation having polarization perpendicular to the gap (i.e., electric field E parallel to the arm containing the gap, as shown). The LC resonance corresponding to the ring current leads to a magnetic dipole moment perpendicular to the SRR plane and an electric dipole moment parallel to the incident electric field. A shorter wavelength Mie resonance is also excited, corresponding to an electric dipole oscillating in the arm opposite the gap. With incident radiation polarized parallel to the gap, only a Mie resonance corresponding to electric dipoles oscillating in the two arms parallel to the gap is observed. The resonances can be strengthened by adding additional, concentric rings, each ring having a gap, to the simple SRR structure. In principle, the resonator response is scalable from radio to infrared and optical frequencies. For the simple SRR described above, both the inductance and capacitance scale proportionally to SRR size, provided that all SRR dimensions are scaled down simultaneously and that the metal retains a high conductivity. Therefore, the resonant frequency scales inversely with a normalized size. Depending on the size, such SRRs can be fabricated using bulk and micromachining techniques known in the art. See D. R. Smith et al., *Phys. Rev. Lett.* 84, 4184 (2000); J. B. Pendry et al., *Science* 312, 1780 (2006); D. R. Smith et al., *Science* 305, 778 (2004); Xin-long Xu et al., *J. Opt. Soc. Am. B.* 23 (6), 1174 (2006); M. W. Klein et al., *Optics Letters* 31 (9), 1259 (2006); and C. Enkrich et al., *Phys. Rev. Lett.* 95, 203901 (2005).

However, the number of different metamaterial element designs that have been published almost rivals the number of groups investigating metamaterials. The variety of designs is a reflection of the lack of a formalized method for designing such structures. Thus, metamaterial design is often a cyclic process of "educated guesswork" and trial-and-error, making extensive use of numerical simulations that are occasionally combined with optimization techniques such as generic algorithms.

The problem of designing an electromagnetic metamaterial is complicated by the pseudo-infinite parameter space governing such materials. For example, a metamaterial unit cell composed of a simple circular SRR (similar to the character "C") on the six faces of a cube comprises $4^6=4096$ possible orientations of the cell in the most general case. Even if the orientations that are indistinguishable due to symmetry are eliminated and the quasi-static limit is invoked, the number of possibilities that would have to be tried in a brute-force approach only reduces to 128. Given typical simulation times on the order of tens of hours for a fully-vectorial numerical electromagnetic simulation for this type of structure, the problem quickly becomes intractable. Additionally, such simulations only provide the net result with limited insight into the inter-element interactions.

Therefore, a need remains for a method to design a metamaterial with predictable functionality and tailorable electromagnetic properties.

SUMMARY OF THE INVENTION

The present invention is directed to a method for designing a metamaterial with a desired electromagnetic response using group theory, comprising selecting an electromagnetic constitutive tensor, determining terms of the electromagnetic constitutive tensor, eliminating symmetry groups that do not meet the constraints of the desired electromagnetic response, and selecting a symmetry group from the remaining symmetry groups and choosing a metamaterial element topology. A reducible representation can be calculated to confirm that the desired electromagnetic response modes are active in the metamaterial element topology. The method can further comprise optimizing the terms of the electromagnetic constitutive tensor by simulating the electromagnetic response of the metamaterial element topology. For example, the metamaterial element topology can comprise a Zia, cross-bar, H-bar, nanorod, or fishnet geometry. For example, the desired electromagnetic response can comprise bianisotropy, isotropy, uniaxial (birefringent), biaxial (trirefringent), free-space matched, chiral, or bi-isotropy.

Group theory can be an invaluable technique for designing metamaterial structures by enabling the prediction of current flow, field orientation, polarization rotation, and electromagnetic response based on the metamaterial element unit cell alone. Group theory can also be used to solve the inverse design problem, narrowing the infinite choice of possible metamaterial elements to a defined set of symmetry choices.

The group theory method was used to design a bianisotropic metamaterial. Therefore, the invention is further directed to a bianisotropic metamaterial comprising an upper planar electrically conducting ring with two opposing capacitive arms, each arm comprising opposing fingers intersecting and oriented perpendicular to the upper ring with $C_2$ symmetry, and a conducting rod through the center of the upper ring that bisects the opposing fingers of each arm; and a lower planar electrically conducting ring with two opposing capacitive arms, each arm comprising opposing fingers intersecting and oriented perpendicular to the lower ring with $C_2$ symmetry, and a conducting rod through the center of the lower ring that bisects the opposing fingers of each arm; and wherein the upper and lower rings are concentric, spaced apart from each other perpendicular to the planar direction, and rotated by an angle of 90° with respect to each other, thereby providing a metamaterial element with $C_{2v}$ symmetry. For example, the upper and lower rings can be circular or square. Three pairs of the upper and lower rings can be placed centered on the opposing faces of a cube to provide a three-dimensional bianisotropic metamaterial.

For example, a Zia bianisotropic metamaterial offers resonant behavior in the effective medium regime and several degrees of freedom that allow for engineering of tailored refractive index and impedance values over a relatively wide range of frequencies. As an example, by changing the finger length of the capacitive arms from 50 μm to 139 μm, it is possible to tune of the index of refraction from 2.5 at $\lambda \approx 2200$ μm (135 GHz) to 4 at $\lambda \approx 3500$ μm (85 GHz). Simulations confirm that strong coupling between electric and magnetic fields at a given resonance frequency can be achieved at perpendicular incidence that is absent at parallel incidence, confirming the bianisotropic behavior of this metamaterial.

In addition to bianisotropic behavior, a metamaterial exhibiting chiral behavior can be designed. Therefore, the invention is further directed to a chiral metamaterial, comprising six planar electrically conducting rings, each ring comprising two opposing capacitive arms, each arm comprising a ring portion of opposing fingers intersecting and oriented perpendicular to the ring and an extended finger portion outside of the ring that is bent with respect to the ring portion and wherein the extended finger portion of the opposing capacitive arms are oriented in opposite directions, and a conducting rod through the center of each ring that bisects the opposing fingers of each arm; and wherein each ring is placed centered on a difference face of a cube and wherein the opposing rings in an incident direction are rotated 180° with respect to each other about the incident axis and wherein at least one of the remaining pairs of opposing rings are rotated by an angle between 0° and 90° in alternating directions about the axis perpendicular to the corresponding cube faces, thereby providing a metamaterial element with $D_2$ symmetry.

As expected, the chiral metamaterial design exhibited differing transmission (reflection) in the same direction for the left circular polarized beam as compared with the right circular polarized beam, indicating chiral behavior. Also, the transmission (reflection) with opposite incident directions for the two polarizations was the same, indicating that the metamaterial was not symmetric with respect to the left- and right-hand orientations. Similar behavior is seen for the phase corresponding to the transmitted and reflected beams, confirming that it is indeed a chiral material.

As a final example, another metamaterial having electromagnetic tensor corresponding to a biaxial, or trirefringent, material was designed. Therefore, the invention is further directed to a biaxial metamaterial, comprising six planar electrically conducting rings, each ring comprising two opposing capacitive arms, each arm comprising opposing fingers intersecting and oriented perpendicular to the ring, and a conducting rod through the center of each ring that bisects the opposing fingers of each arm; and wherein each ring is placed centered on a different face of a cube and wherein the opposing rings in an incident direction are aligned parallel with respect to each other about the incident axis and wherein at least one of the remaining pairs of opposing rings are rotated by an angle between 0° and 90° in alternating directions about the axis perpendicular to the corresponding the corresponding cube faces, thereby providing a metamaterial element with $D_{2h}$ symmetry.

The biaxial metamaterial exhibited a change of polarization inherent in such materials, where the field vectors of the beam exiting the metamaterial under linearly polarized incident radiation was seen to be rotating during each cycle of the electromagnetic oscillation, indicating elliptical polarization and hence biaxial behavior of the material.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 7 shows the four quadrants of the electromagnetic constitutive tensor and how they are accessed.

FIGS. 24A-D show the field vectors of the beam exiting the metamaterial under linearly polarized incident, where the field vectors can be seen to be rotating during each cycle of the electromagnetic oscillation at 45° (FIG. 24A), 135° (FIG. 24B), 225° (FIG. 24C), and 315° (FIG. 24D), indicating elliptical polarization and hence biaxial behavior of the material.

DETAILED DESCRIPTION OF THE INVENTION

A method based on group theory can be used for the design and optimization of the electromagnetic properties of metamaterials, the basis for which was recently proposed by Padilla and subsequently demonstrated by Wongkasem et al. See W. J. Padilla, *Optics Express* 15 (4), 1639 (2007); and N. Wongkasem et al., *Progress in Electromagnetics Research* 63, 295 (2006). Group theory can be used to predict electric and magnetic resonances of metamaterial inclusions for any incident field, including the existence and isotropic nature of the electromagnetic constitutive relationship. Using this framework, the fundamental properties of a metamaterial design can be elucidated based on the symmetry class to which the unit cell belongs.

Group theory has been used extensively in chemistry, where molecules are classified by symmetry and the spectroscopic or molecular orbital properties identified according to symmetry group. See F. A. Cotton, *Chemical Applications of Group Theory*, 3$^{rd}$ ed., John Wiley & Sons, New York, 1990. This branch of chemistry has a number of similarities to electromagnetism that allow for well-developed concepts from that field to be applied analogously to metamaterial design. In molecular spectroscopy, molecules are grouped according to their symmetry, with groups of the same symmetry exhibiting the same molecular vibrational modes. Thus, a molecule can be identified as, for example, IR or Raman active based solely on its symmetry group and without having to evaluate the actual modal solutions of the governing equations of motion.

Figure 1:
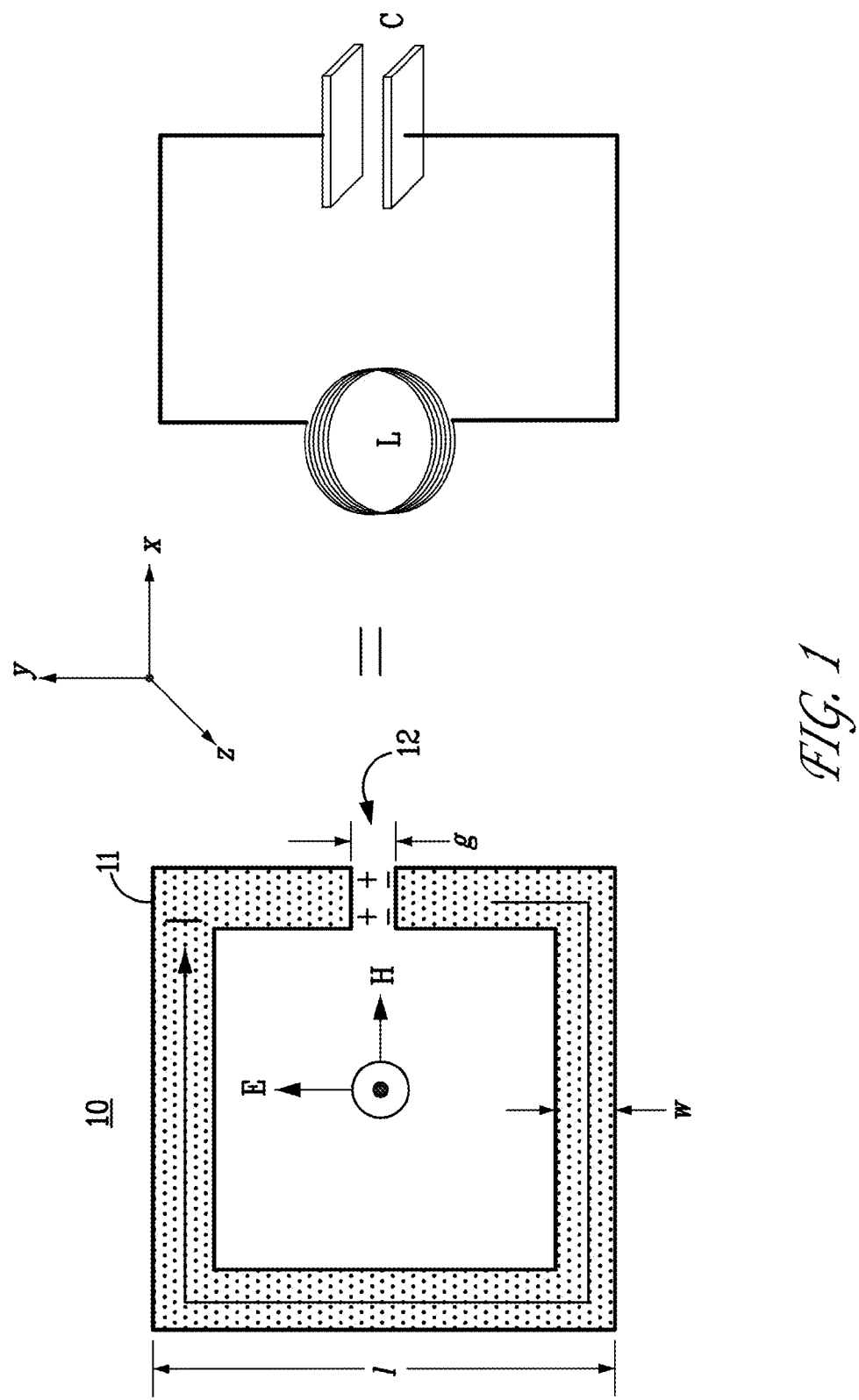
FIG. 1 is a schematic illustration of a simple split-ring resonator (SRR) comprising a metallic ring with a gap.
Figure 2:
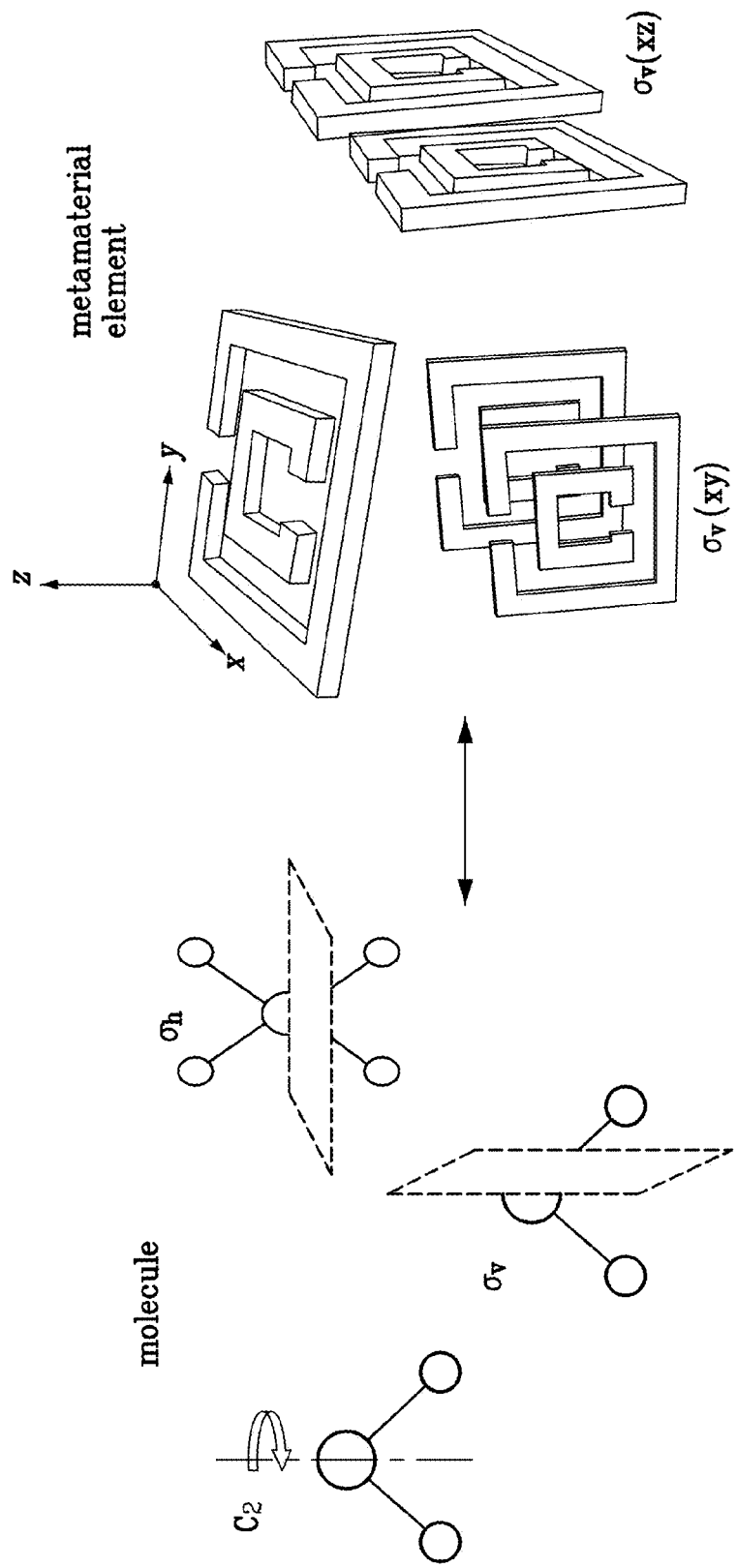
FIG. 2 is a schematic illustration of the analogy between molecules and metamaterial elements as they relate to group theory.

By making the comparisons that molecules in chemistry are analogous to metamaterial elements in electromagnetics and similarly that molecular normal modes of vibration are analogous to the fundamental resonant electrical current modes, the principles of symmetry and point groups can be applied to metamaterial designs, as shown in FIG. 2 for an SRR element comprising two concentric rings. FIG. 2 also illustrates the symmetry operations for the case of a simple $C_{2v}$ molecule, for example $H_2O$. Given these assumptions, the symmetry of a metamaterial element can be used to determine its point group, a character table can be constructed based on the point group, and the generalized motion in terms of the normal modes of the element can be found from the character table. A point group is a collection of all of the possibly symmetry elements of a metamaterial element, and the corresponding character table is a matrix representation of the various symmetries represented by the point group. The details of the process for determining the point group of a molecule (or a metamaterial element) can be found in many chemistry textbooks. See G. L. Miessler and D. A. Tarr, *Inorganic Chemistry*, 4$^{th}$ ed., Prentice Hall, New Jersey, 2010.

Figure 3:
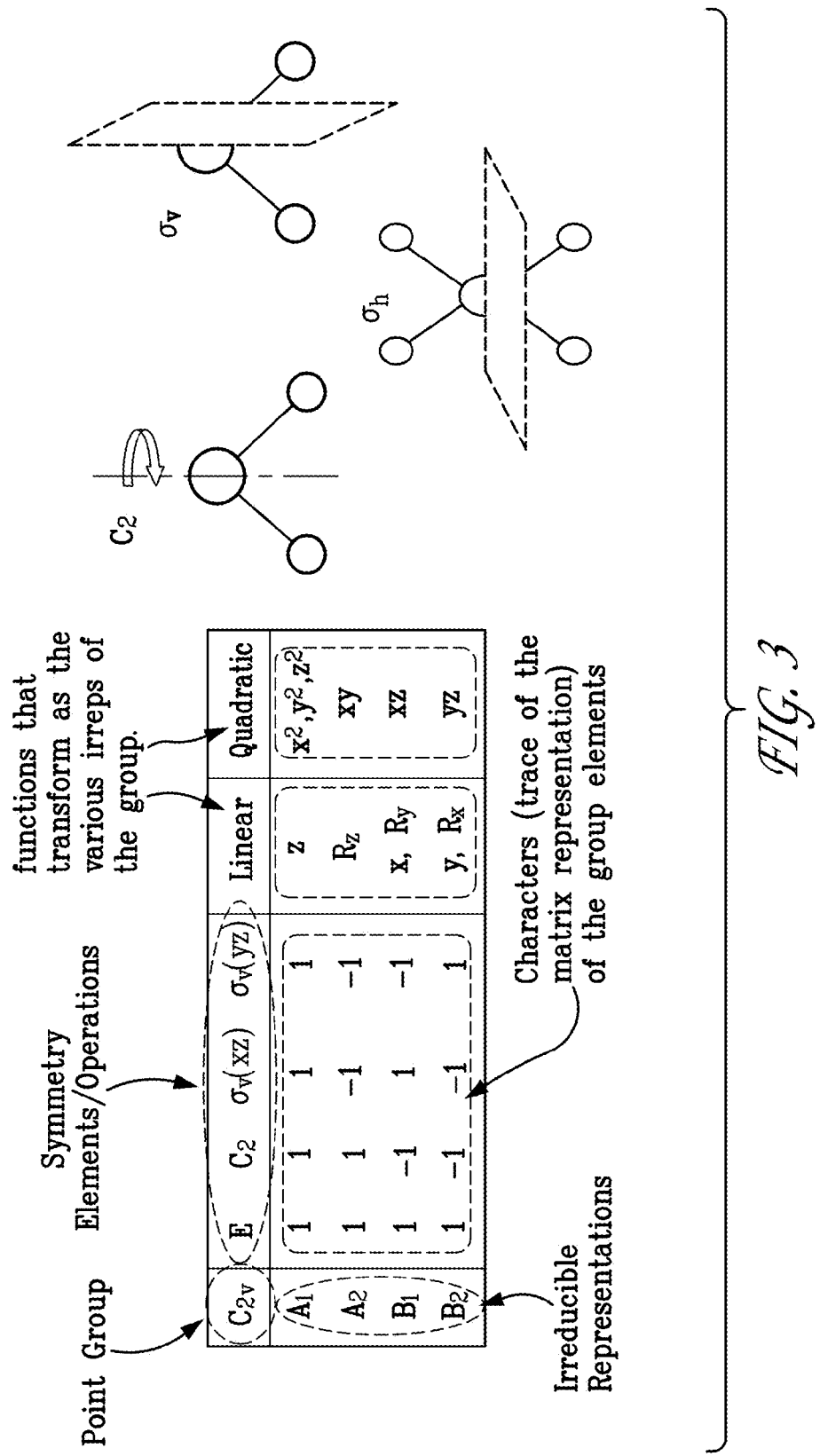
FIG. 3 shows the character table of the $C_{2v}$ point group and a representative molecule belonging to that point group, demonstrating the corresponding symmetry operations.

As an example, a molecule belonging to the $C_{2v}$ point group, which is the same symmetry group as a basic SRR, is shown in FIG. 3 along with the corresponding character table. The first column in the table lists the point group symmetry under analysis ($C_{2v}$) and its irreducible representations ($A_1$, $A_2$, $B_1$, and $B_2$). The following four columns list the symmetry operations (E, $C_2$, $\sigma_v(xz)$ and $\sigma_v(yz)$) of the $C_{2v}$ point group and the corresponding characters, followed by the equivalent irreducible representations in linear and quadratic terms of the Cartesian coordinates in the last two columns. The character of the molecule expresses the symmetry-adapted linear combinations (SALCs), in terms of the irreducible representations. In molecular chemistry, this irreducible representation is combined with the matching atomic orbitals to generate the SALCs of orbitals for that molecule. When applied to metamaterials, the SALCs correspond to current modes of the metamaterial element.

Given that group theory is based upon symmetry rules and symmetry operations, it imposes some restrictions on the system under analysis. First, in the case of metamaterials, it assumes that incident electromagnetic fields are quasi-static. For the electromagnetic fields to be considered quasi-static, the unit cell dimension, a, has to be much smaller than the wavelength, $\lambda$, of the incident field, typically constrained as a/$\lambda$<10. Second, because the form of the governing Maxwell's equations, the solution of any electromagnetic problem strongly depends on its boundary conditions; if they are symmetric, the solution will also be symmetric. This transforms the problem into a boundary value problem where one can predict the symmetry properties of the solution without actually solving Maxwell's equations. As an example of this principle, group theory can be used to predict which field distributions are allowed between two infinite parallel electrically conducting plates. Since any valid solution of the field has to have both vertical and horizontal symmetries, as the parallel plates do, group theory can predict that field distributions having corresponding symmetries are allowed while asymmetric ones are not. Thus, group theory makes it possible to find the electric and magnetic properties of any shape without having to solve any equations of motion, as long as the metamaterial possesses symmetry and is a good conductor. Based on this group theory approach, the forward problem for determining the properties of a metamaterial can be described by the following method. The symmetry point group is first determined, then the character table of the reducible representation is calculated, the reducible representation is expressed in terms of the irreducible representation, the SALCs are constructed, and finally the resonant current modes are determined based of the type of excitation that is assumed. See W. J. Padilla, *Optics Express* 15 (4), 1639 (2007).

Method of Designing a Metamaterial with a Desired Electromagnetic Response

The power of the group theory technique is fully revealed in the inverse problem method of the present invention, where the topology of the elements of a metamaterial can be engineered from its desired electromagnetic constitutive tensor. Therefore, given a desired electromagnetic response and a generic metamaterial elemental design, group theory is applied to predict the various ways that the element can be arranged in three dimensions to produce the desired functionality. An optimizer can then be applied to an electromagnetic modeling tool to fine tune the values of the electromagnetic properties of the resulting metamaterial topology.

Figure 4:
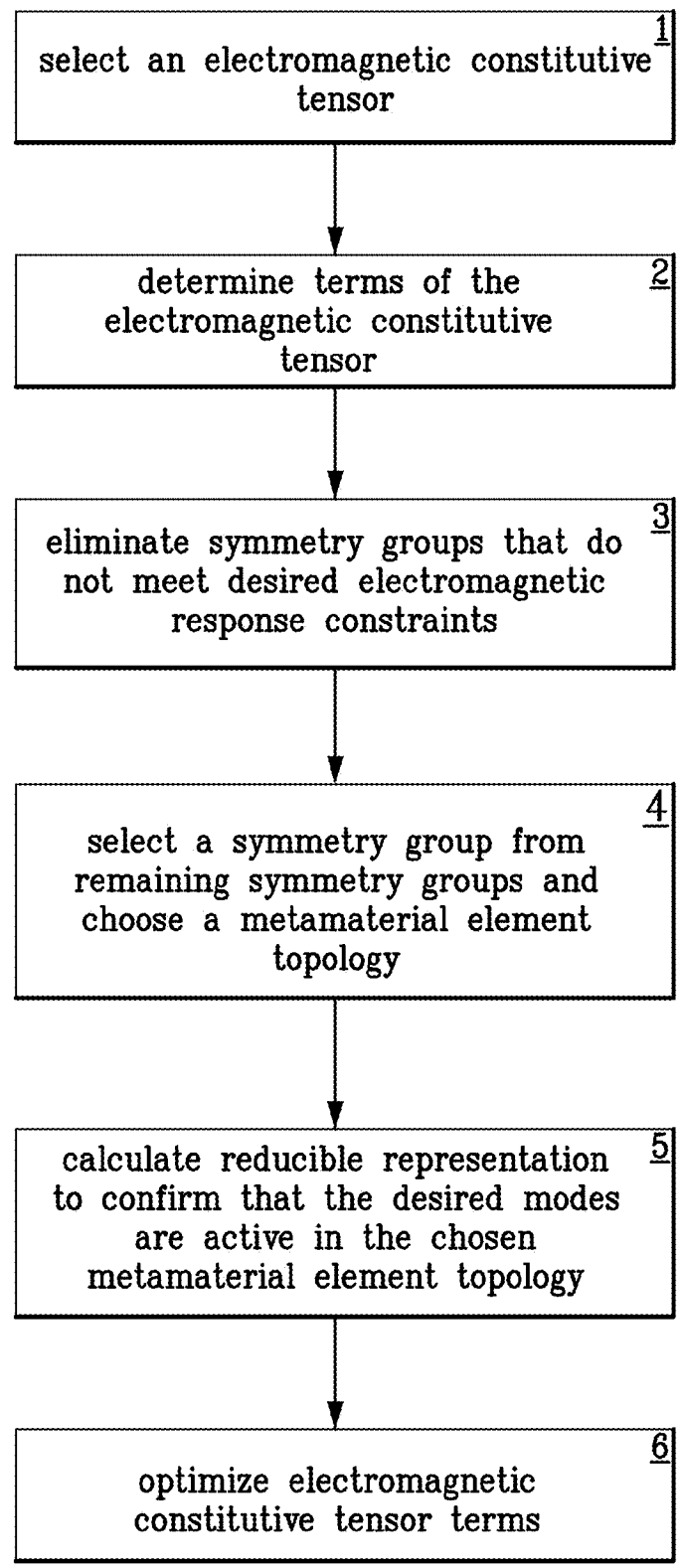
FIG. 4 is an illustration of the steps of the method of the present invention.

The method of the present invention in illustrated in FIG. 4. The method starts at step 1 with the selection of a desired electromagnetic constitutive tensor, in which the tensor terms that are active (i.e., possibly nonzero for $\zeta$, $\xi$, and off-diagonal $\epsilon$ and $\mu$ terms or possibly non-unity for diagonal $\epsilon$ and $\mu$ terms) can be specified, although their actual values cannot be determined by group theory alone but rather must be tuned by the geometrical and material properties of the actual metamaterial elements. The chosen electromagnetic tensor dictates the form of the electromagnetic interactions that produce that behavior at step 2, which determines the linear and axial terms that must be present in the character table of the corresponding metamaterial elements. This determined set of terms allows for the elimination of symmetry groups that do not meet the desired electromagnetic response constraints at step 3, thereby reducing the number of possible symmetry groups (the number of options remaining after the reduction may be only one). At step 4, a symmetry group that is selected (most often the one having the least complexity) that gives the character table and hence symmetry operations that correspond to that symmetry group. A metamaterial element topology is chosen that belongs to the selected symmetry group, which can often be constructed of two or more simpler topologies of a closely related symmetry group (as an example, the case with the $C_{2v}$ Zia geometry that is essentially composed of two $C_2$ Zia rings will be described in detail below). At step 5, the reducible representation can be calculated to confirm the activity of the requisite normal modes, which may have to be modified until the desired behavior is produced. The actual design topology can still take any form that has the correct geometrical symmetry, but is often further constrained by fabrication and/or simulation capabilities. Once a topology is chosen, the electromagnetic constitutive tensor terms can be optimized through a cycle of simulating electromagnetic response of the resulting metamaterial and retrieving the tensor terms from the calculated S parameters at step 6.

Any category of electromagnetic response can be addressed by this method, as well as any metamaterial unit cell, although unit cells with nonsymmetrical geometries will have trivial forms. Some examples of electromagnetic responses include isotropic, uniaxial (birefringent), biaxial (trirefringent), free-space matched, bianisotropic, and bi-isotropic (such as chiral and gyrotropic) materials. Some examples of other metamaterial unit cells that can be treated with this method are the Zia (shown in FIG. 5), cross-bar, H-bar, fishnet, and nanorod geometries (shown in FIGS. 6(*a*)-(*d*)).

The four quadrants of the electromagnetic constitutive tensor are accessed as shown in FIG. 7, with the understanding that linear terms correspond to currents in straight wires that can interact with an incident electric field of suitable orientation, and axial terms correspond to current loops that can interact with an incident magnetic field of suitable orientation. Thus, diagonal $\epsilon$ terms are provided by independent r modes (where r represents either x, y, or z), and diagonal μ terms by independent $R_i$ modes (indicating the x, y, or z rotational modes); multiple terms that are not enclosed in parentheses indicate simultaneous, uncoupled modes. The sand terms are provided by $r_i,R_i$ modes (simultaneous linear and axial motions), and the off-diagonal ε and μ terms by $(r_i,r_j)$ (i≠j, i.e., coupled linear motions) and $(R_i,R_j)$ (i≠j, i.e., coupled rotational motions) modes, respectively. This interpretation differs from that of Padilla (See W. J. Padilla, *Optics Express* 15 (4), 1639 (2007)) and others, who considered the $r_i,r_j$ modes to be coupled linear motions and did not provide interpretations for the $(r_i,r_j)$ notation. The $(r_i,r_j)$ notation should indicate coupled linear motions (and hence off-diagonal ε and μ terms) and the $r_i,r_j$ notation should indicate multiple independent linear motions that exist for a single mode of a symmetry group. This can be understood intuitively by considering that it is not physically meaningful for linear and rotational modes to be coupled, hence $r_i,R_i$ modes are never seen enclosed in parentheses.

To illustrate the power of this inverse group theory design methodology, the design of three different metamaterial elements with engineered electromagnetic behavior is described below. The illustrated examples are all based on the Zia-element design and include: a bianisotropic metamaterial, a chiral metamaterial, and a biaxial metamaterial.

Design of a Bianisotropic Metamaterial

Of particular interest in the realm of metamaterials is the possibility of constructing a bianisotropic metamaterial, in which the electric and magnetic fields are coupled and the coupling depends on the direction of the incident wave, since such a material is a promising candidate for creating a left-handed metamaterial. See G. P. Bava, *Electronics Letters* 4 (14), 299 (1968). The relationship between the electric and magnetic fields in such a material can be expressed as an electromagnetic constitutive tensor. Once the SALCs of a given symmetry point group are found, the related constitutive tensor terms can be determined. Eq. (1) shows the most complete set of electromagnetic constitutive relations that is needed to fully describe a bianisotropic material. See I. V. Lindell et al., *Electromagnetic Waves in Chiral and Bi-Isotropic Media*, Artech House, Inc., Massachusetts, 1994.

$$\begin{bmatrix} D \\ B \end{bmatrix} = \begin{bmatrix} \bar{\varepsilon} & \bar{\xi} \\ \bar{\zeta} & \bar{\mu} \end{bmatrix} \begin{bmatrix} E \\ H \end{bmatrix}, \text{ where} \quad (1)$$

$$\bar{\varepsilon} = \begin{bmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{bmatrix},$$

Similar forms exist for the other three sub-tensors. Here ε and μ are the regular tensor relations between the electric or magnetic flux density (D and B, respectively) and the electric or magnetic field intensity (E and H, respectively), while ζ and ξ are the crossed relations between flux densities and field intensities that describe the electromagnetic coupling. As an example of how these tensor terms can be determined, consider the column of linear terms in the character table for the $C_{2v}$ point group in FIG. 3. Since the electric field is linear with current, it will transform under symmetry operations as the position vector r or simply as the linear Cartesian coordinates x, y, z. On the other hand, the magnetic field is axial with the current, and consequently will transform under the rotation $R_x$, $R_y$, $R_z$ symmetry operations. Thus, the character table predicts that there is one purely electric term, one purely magnetic term, and two cross terms. Assuming that reciprocity holds, and thus $\zeta^T=-\xi$, this gives an electromagnetic constitutive relationship that can be expanded as:

$$\begin{bmatrix} \bar{\varepsilon} & \bar{\xi} \\ \bar{\zeta} & \bar{\mu} \end{bmatrix} = \begin{bmatrix} 1 & 0 & 0 & 0 & \xi_{xy} & 0 \\ 0 & 1 & 0 & \xi_{yx} & 0 & 0 \\ 0 & 0 & \varepsilon_{zz} & 0 & 0 & 0 \\ 0 & -\xi_{yx} & 0 & 1 & 0 & 0 \\ -\xi_{xy} & 0 & 0 & 0 & 1 & 0 \\ 0 & 0 & 0 & 0 & 0 & \mu_{zz} \end{bmatrix}. \quad (2)$$

Bianisotropy for the $C_{2v}$ point group appears upon incident wave excitation along the principal axis of rotation (z axis) or perpendicular to the plane, in the case of a SRR. The bianisotropic response can be easily identified from the character table in FIG. 3 or the constitutive relationship given by Eq. (2), where an electric field in the y-direction yields a magnetic field in the x-direction and vice versa. Based on the argument made in the previous section, the constitutive relationship in Eq. (2) implies that a character table needs to have z, $R_z$, x,$R_y$, and y,$R_x$ modes. While the SRR design has the benefits of relatively easy fabrication and simulation, it is limited by its topology to only a few degrees of freedom, primarily the gap width, metal trace thickness, and the period of the elements. This limitation makes it difficult to tune the electrical response of the SRR element without simultaneously changing the magnetic behavior, thus limiting the functionality of the metamaterial device.

Using group theory to find a more suitable design for a metamaterial element, as many symmetry groups as possible are eliminated from consideration. Low symmetry groups, such as $C_1$, are typically isotropic and thus can be disqualified immediately, as well as high symmetry groups, such as $I_h$, which are rarely bianisotropic. This leaves the "moderate symmetry" groups, among which any with an "h" designation, such as $D_{2h}$, will be not be bianisotropic. Thus, all symmetry groups containing $\sigma_h$ symmetry should be avoided, which includes all single-layer planar structures. One way to do this is to eliminate the $C_n$ axis that is perpendicular to the plane, leaving one of the in-plane $C_n$ axes to be the highest-order rotational axis (this makes any $\sigma_h$ symmetry become $\sigma_v$). Clearly, the $C_{2v}$ group represents one example of a symmetry point group that fits all of these constraints, as well as the linear/axial modes mentioned above.

Figure 5:
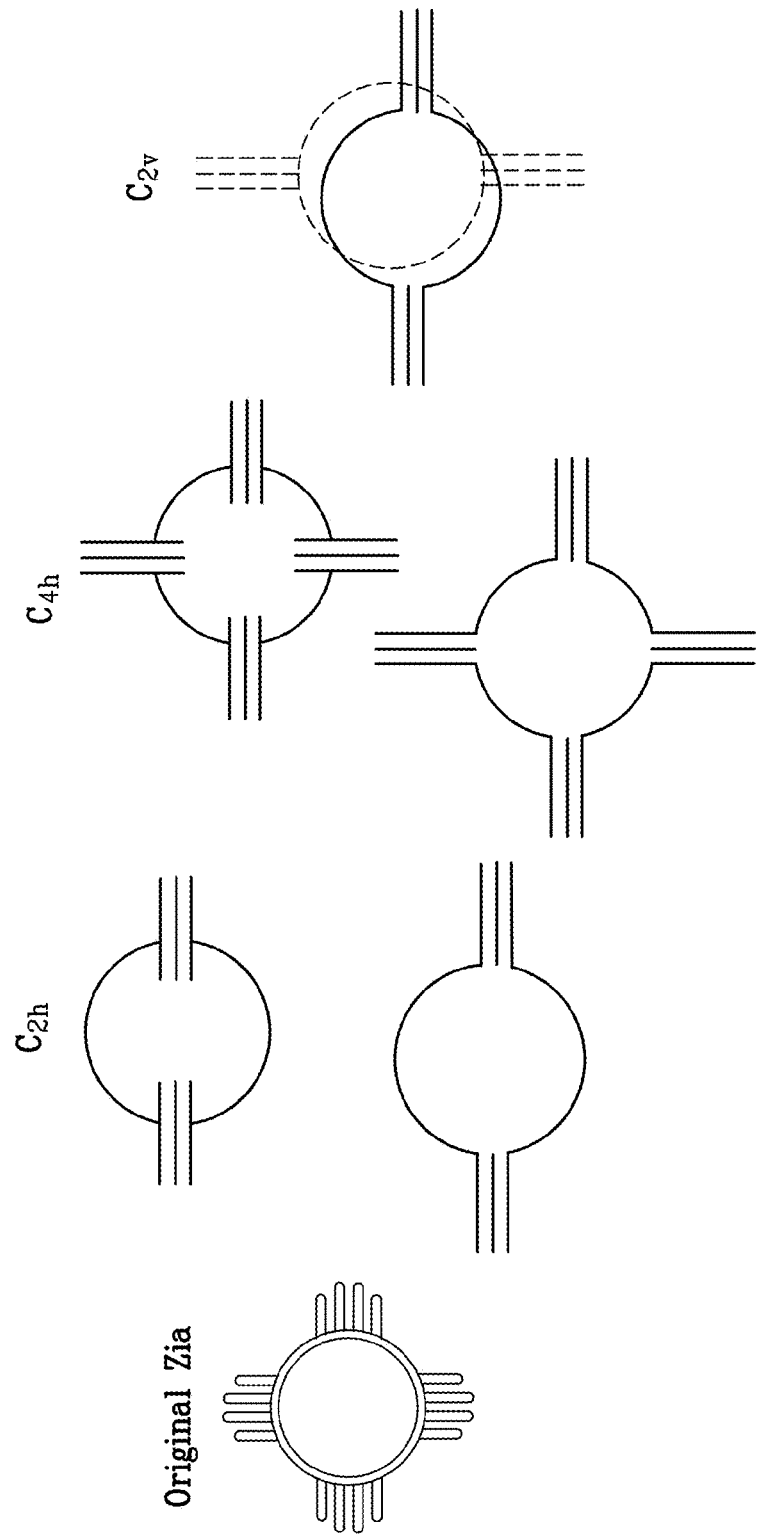
FIG. 5 shows possible symmetry point groups of the Zia geometry.
Figure 6B:
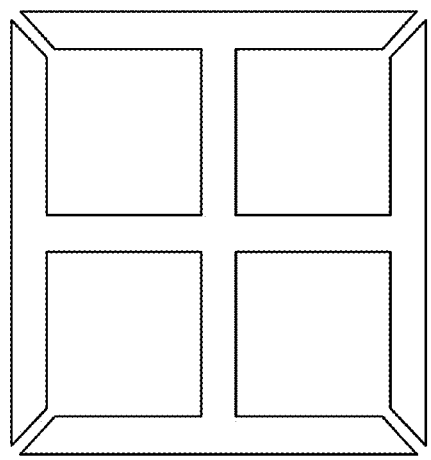
FIGS. 6(a)-(d) shows examples of other metamaterial unit cells that can be treated with the method of the present invention, namely cross-bar, H-bar, fishnet, and nanorod geometries.
Figure 6D:
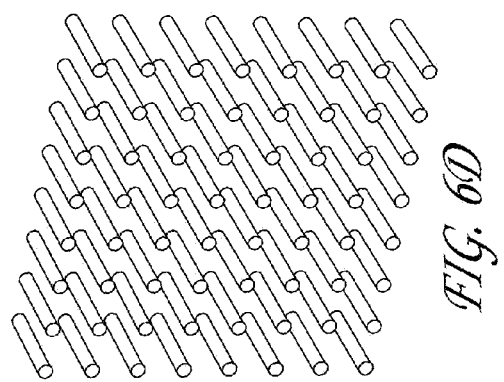
Figure 6A:
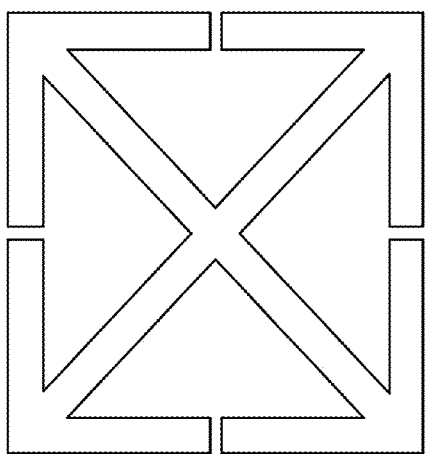
Figure 6C:
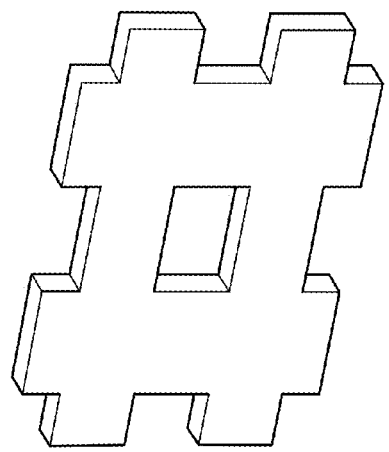

To alleviate the limitations of the SRR design, a generic bianisotropic metamaterial element can be selected that retains most of the ease of fabrication inherent in the SRR, while adding the ability to independently modify the electric and magnetic response. FIG. 5 shows the various symmetry point groups of a geometry called the Zia. The Zia geometry combines a ring structure that gives it inductance with tunable capacitances across the arms that intersect the ring. Although the Zia geometry has several point group variants, a $C_{2v}$ or similar symmetry configuration provides a bianisotropic metamaterial. The $C_{2v}$ design consists of two concentric $C_2$ symmetry rings, placed one on top of the other one in the planar direction and spaced apart, with one $C_2$ ring rotated by an angle of 90° with respect to the other. A metamaterial element having $C_{2v}$ symmetry demonstrates bianisotropic behavior, and allows for tuning of the electrical resonance, via the capacitive arms intersecting the ring, independently of the magnetic resonance, which can be tuned by changing the radius of the ring. Thus, the electric and magnetic resonances of the resonator elements, and consequently the resonance of the metamaterial array, can be aligned without rotating the polarization.

Figure 8:
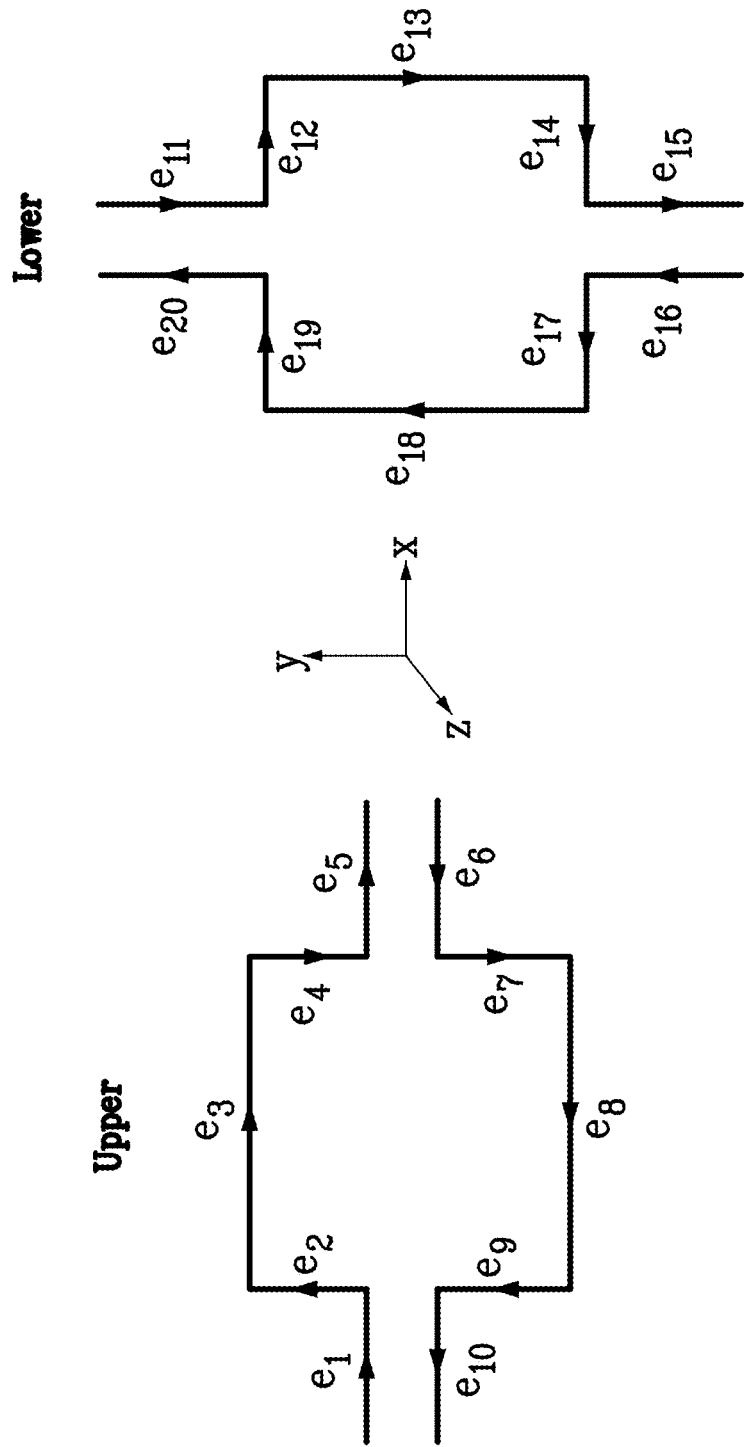
FIG. 8 is a simplified schematic showing a possible set of current basis segments for a Zia metamaterial element.
Figure 9:
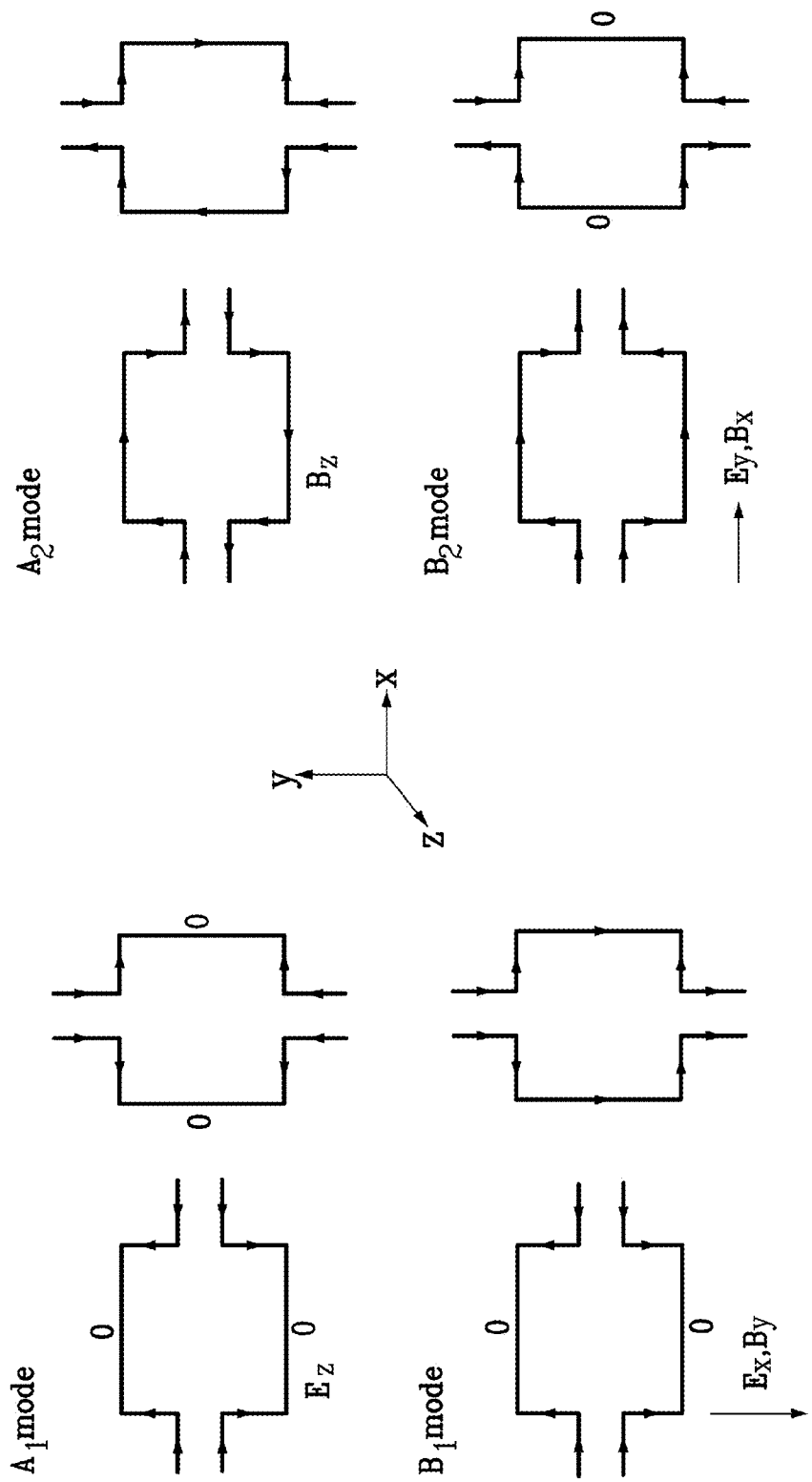
FIG. 9 shows the current modes of the Zia element as predicted by group theory.

To determine the resonant modes of the Zia metamaterial element, each symmetry operation of the character table of the $C_{2v}$ point group is applied to a set of basis currents chosen for a given Zia design. The basis vectors can be represented as current segments for the upper and lower rings of the simplified Zia topology, as shown in FIG. 8 for a given set of assumed bases. These are areas of the upper and lower rings that can be polarized by an external electric field (i.e., currents can flow in these directions). Next, the effect of each symmetry operation on the current basis vectors can be tabulated, as shown in Table 1. Rows list the symmetry operations (E, $C_2$, $\sigma_{xz}$, and $\sigma_{yz}$) and columns the current basis vectors ($e_1$ to $e_{20}$). The body of the table indicates where the basis vector ends up after each symmetry operation.

where the left-most matrix represents the body of the character table shown in FIG. 3, the other matrix represents the body of Table 1, and $\phi'$ represents a mode (SALC) of the design. Finally, the four modes represented in the SALC are shown in FIG. 9 for one of the equivalent representations possible as allowed by the $C_{2v}$ point group symmetry operations. For example, an electric field polarized along the z axis ($E_z$) transforms as the $A_1$ mode. Note that group theory guarantees that if either the electric or magnetic field is coupled and resonates, the other field (either magnetic or electric) will be coupled and will resonate as well, which ensures that both effects will be tied together and thus occur at the same frequency assuming that such coupling and resonance exists. Thus, an electric field polarized along the x axis ($E_x$) or a magnetic field polarized along the y axis ($B_y$) will transform as $B_2$ symmetry and result in a resonance at the same frequency.

TABLE 1

Effect of $C_{2v}$ Symmetry Operations on the Current Basis Vectors

| $C_{2v}$ | $e_1$ | $e_2$ | $e_3$ | $e_4$ | $e_5$ | $e_6$ | $e_7$ | $e_8$ | $e_9$ | $e_{10}$ | $e_{11}$ | $e_{12}$ | $e_{13}$ | $e_{14}$ | $e_{15}$ | $e_{16}$ | $e_{17}$ | $e_{18}$ | $e_{19}$ | $e_{20}$ | $\chi_r$ |
|---|---|---|---|---|---|---|---|---|---|---|---|---|---|---|---|---|---|---|---|---|---|
| E | $e_1$ | $e_2$ | $e_3$ | $e_4$ | $e_5$ | $e_6$ | $e_7$ | $e_8$ | $e_9$ | $e_{10}$ | $e_{11}$ | $e_{12}$ | $e_{13}$ | $e_{14}$ | $e_{15}$ | $e_{16}$ | $e_{17}$ | $e_{18}$ | $e_{19}$ | $e_{20}$ | 20 |
| $C_2$ | $e_6$ | $e_7$ | $e_8$ | $e_9$ | $e_{10}$ | $e_1$ | $e_2$ | $e_3$ | $e_4$ | $e_5$ | $e_{16}$ | $e_{17}$ | $e_{18}$ | $e_{19}$ | $e_{20}$ | $e_{11}$ | $e_{12}$ | $e_{13}$ | $e_{14}$ | $e_{15}$ | 0 |
| $\sigma_{xz}$ | $-e_5$ | $-e_4$ | $-e_3$ | $-e_2$ | $-e_1$ | $-e_{10}$ | $-e_9$ | $-e_8$ | $-e_7$ | $-e_6$ | $-e_{20}$ | $-e_{19}$ | $-e_{18}$ | $-e_{17}$ | $-e_{16}$ | $-e_{15}$ | $-e_{14}$ | $-e_{13}$ | $-e_{12}$ | $-e_{11}$ | $-2$ |
| $\sigma_{yz}$ | $-e_{10}$ | $-e_9$ | $-e_8$ | $-e_7$ | $-e_6$ | $-e_5$ | $-e_4$ | $-e_3$ | $-e_2$ | $-e_1$ | $-e_{15}$ | $-e_{14}$ | $-e_{13}$ | $-e_{12}$ | $-e_{11}$ | $-e_{20}$ | $-e_{19}$ | $-e_{18}$ | $-e_{17}$ | $-e_{16}$ | $-2$ |

The number of times each irreducible representation occurs, $a_m$, can be calculated as:

$$a_m = \frac{1}{h} \sum_i n_i \chi(i) \chi_m(i), \quad (3)$$

where h is the number of symmetry operations in the point group (h=4 for the $C_{2v}$ point group), $n_i$ is number of symmetry operations in each class i, $\chi$ is the character of a reducible representation, and $\chi_m$ is character of the $m^{th}$ irreducible representation. This calculation performed for the Zia design represented in FIG. 8 results in a reducible representation that can be written as $\Gamma = 4A_1 + 6A_2 + 5B_1 + 5B_2$. The SALCs, or current modes, of the Zia design can be generated by applying the symmetry operations, as shown in the following expression Electromagnetic Simulation of the Bianisotropic Zia Metamaterial Element To test the validity of the behavior predicted by group theory for the bianisotropic metamaterial, simulations of the Zia design were performed using the commercial software package CST Microwave Studio™. The frequency domain solver was used for this application, with unit cell (i.e., periodic) boundary conditions implemented to simulate an infinitely large sheet in the in-plane directions of the metamaterial. The single-layer thick Zia metamaterial structure was modeled with 1 μm thick traces composed of gold in air as host material; with nominal dimensions listed in Table 2 corresponding to the parameters in FIG. 10.

$$\begin{bmatrix} \varphi'(A_1) \\ \varphi'(A_2) \\ \varphi'(B_1) \\ \varphi'(B_2) \end{bmatrix} = \begin{bmatrix} 1 & 1 & 1 & 1 \\ 1 & 1 & -1 & -1 \\ 1 & -1 & 1 & -1 \\ 1 & -1 & -1 & 1 \end{bmatrix} \cdot \quad (4)$$

| $e_1$ | $e_2$ | $e_3$ | $e_4$ | $e_5$ | $e_6$ | $e_7$ | $e_8$ | $e_9$ | $e_{10}$ | $e_{11}$ | $e_{12}$ | $e_{13}$ | $e_{14}$ | $e_{15}$ | $e_{16}$ | $e_{17}$ | $e_{18}$ | $e_{19}$ | $e_{20}$ |
|---|---|---|---|---|---|---|---|---|---|---|---|---|---|---|---|---|---|---|---|
| $e_6$ | $e_7$ | $e_8$ | $e_9$ | $e_{10}$ | $e_1$ | $e_2$ | $e_3$ | $e_4$ | $e_5$ | $e_{16}$ | $e_{17}$ | $e_{18}$ | $e_{19}$ | $e_{20}$ | $e_{11}$ | $e_{12}$ | $e_{13}$ | $e_{14}$ | $e_{15}$ |
| $-e_5$ | $-e_4$ | $-e_3$ | $-e_2$ | $-e_1$ | $-e_{10}$ | $-e_9$ | $-e_8$ | $-e_7$ | $-e_6$ | $-e_{20}$ | $-e_{19}$ | $-e_{18}$ | $-e_{17}$ | $-e_{16}$ | $-e_{15}$ | $-e_{14}$ | $-e_{13}$ | $-e_{12}$ | $-e_{11}$ |
| $-e_{10}$ | $-e_9$ | $-e_8$ | $-e_7$ | $-e_6$ | $-e_5$ | $-e_4$ | $-e_3$ | $-e_2$ | $-e_1$ | $-e_{15}$ | $-e_{14}$ | $-e_{13}$ | $-e_{12}$ | $-e_{11}$ | $-e_{20}$ | $-e_{19}$ | $-e_{18}$ | $-e_{17}$ | $-e_{16}$ |

TABLE 2

Figure 10:
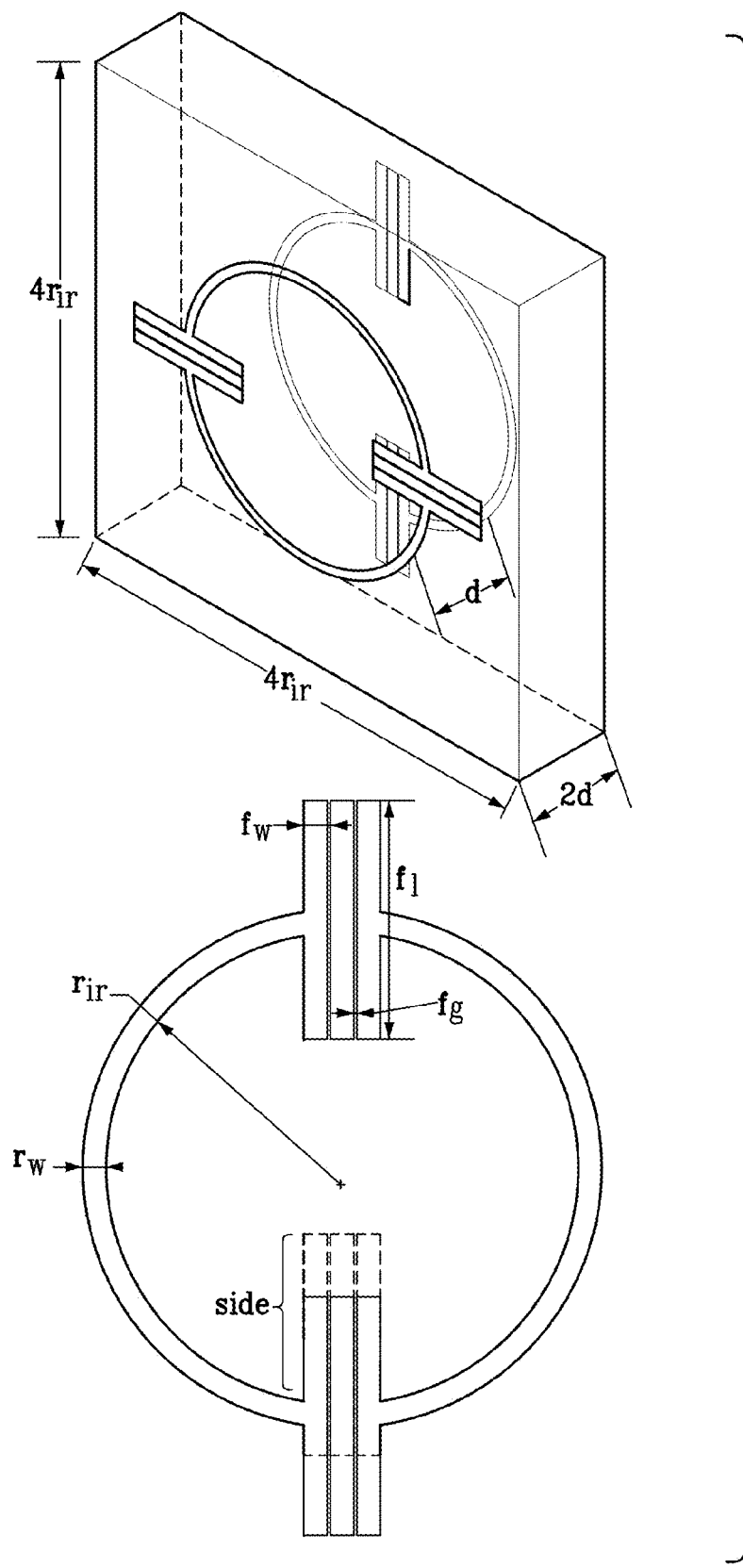
FIG. 10 is a schematic illustration of the unit cell of a single Zia metamaterial element showing the relevant dimensions used in a simulation of the electromagnetic response to a plane excitation wave; the metal traces are gold and the background is air.

Dimensions of Zia element parameters shown in FIG. 10.

| Parameter | | | | | | | |
|---|---|---|---|---|---|---|---|
| d | $r_{ir}$ | $f_w$ | $f_l$ | $f_g$ | $r_w$ | period, a | side |
| Dimension 50 μm | 100 μm | 10 μm | 100 μm | 1 μm | 10 μm | $4r_{ir}$ = 400 μm | 0 (centered) |

Figure 11:
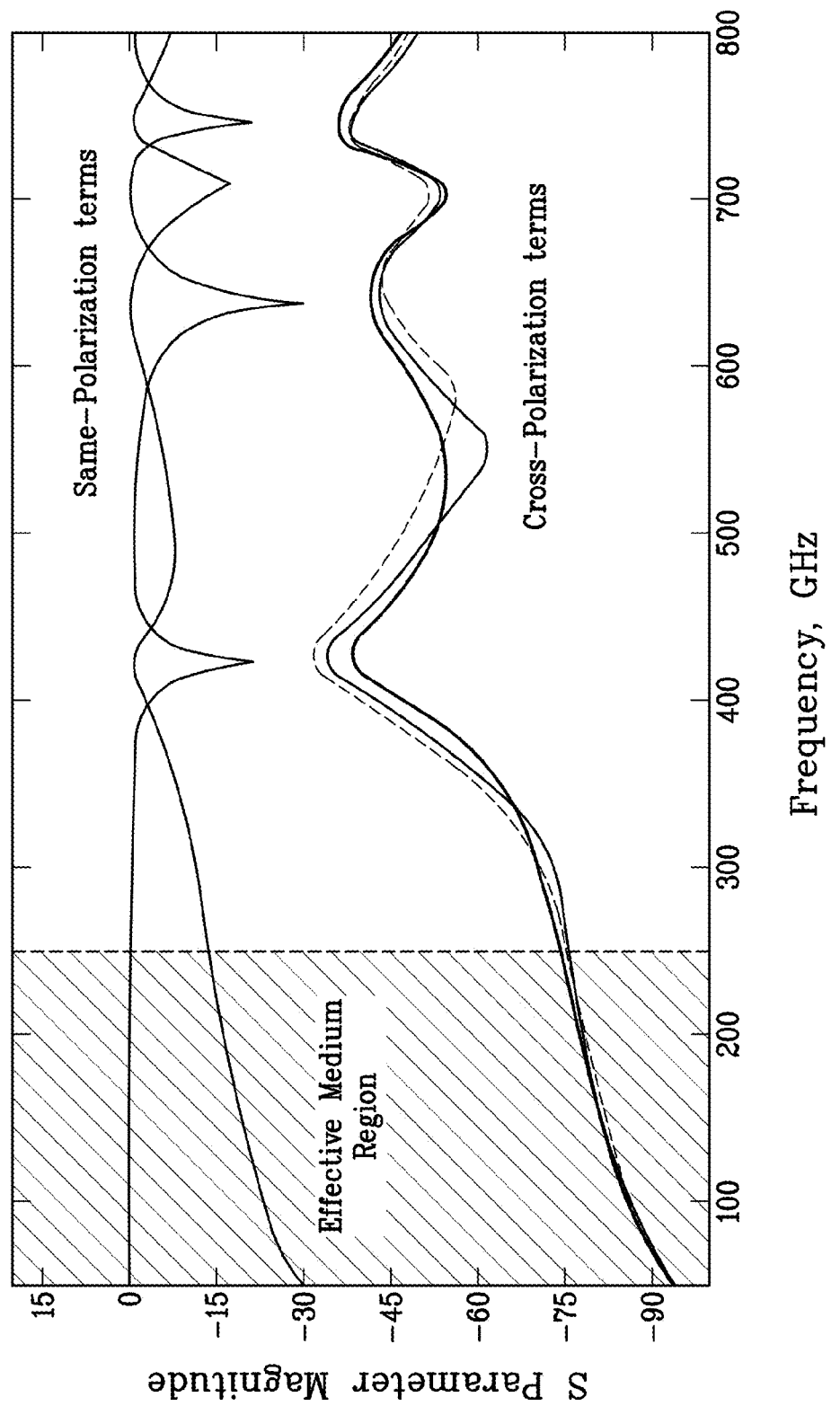
FIG. 11 is a graph of the S-parameter frequency response of the Zia metamaterial for both same- and cross-polarization terms.

In the simulations, plane excitation waves were launched perpendicular to the metamaterial sheet (i.e., in the z direction) from both sides and using two polarizations: vertical linear and horizontal linear. Although at the wavelength of excitation the metamaterial appears essentially identical from either side of the sheet, both ports were allowed to be the source to verify the reciprocity of the metamaterial. Same-polarization and cross-polarization terms were also calculated to study whether the Zia design preserves the incident polarization or imposes an abnormal polarization rotation. Thus, a total of sixteen S-parameter results were calculated for each two-port simulation, four corresponding to the various S-parameters for each polarization multiplied by the four possible self- and cross-polarization permutations. Each parameter has the form $S_{i,p,j,q}$, where i represents the output port number (1 or 2), p represents the polarization measured at the output port (vertical or horizontal), j represents the input port number (1 or 2), and q represents the polarization radiated at the input port (vertical or horizontal); for instance, $S_{2,v,1,h}$ represents the transmission coefficient from port 1 radiating a horizontally polarized wave to port 2 detecting a vertically polarized wave. Since, according to Eq. (2), the polarization of an incoming wave is preserved by this metamaterial (no rotation of polarization), it is expected that $S_{i,p,j,q} \approx 0 \forall i,j,p \neq q$. Furthermore, since this is a passive metamaterial possessing $C_{2v}$ symmetry, it can be further predicted that $S_{i,p,j,p} \approx S_{j,q,i,q} \forall p,q,i \neq j$ and $S_{i,p,i,p} \approx S_{j,q,j,q} \forall p \neq q, i \neq j$. This behavior can be deduced from FIG. 11, where the simulated S-parameters are plotted for frequencies from 67-800 GHz. Three groups of terms can clearly be distinguished: the two same-polarization groups, between 0 dB and roughly −30 dB; and the cross-polarization group, below −30 dB.

Figure 12:
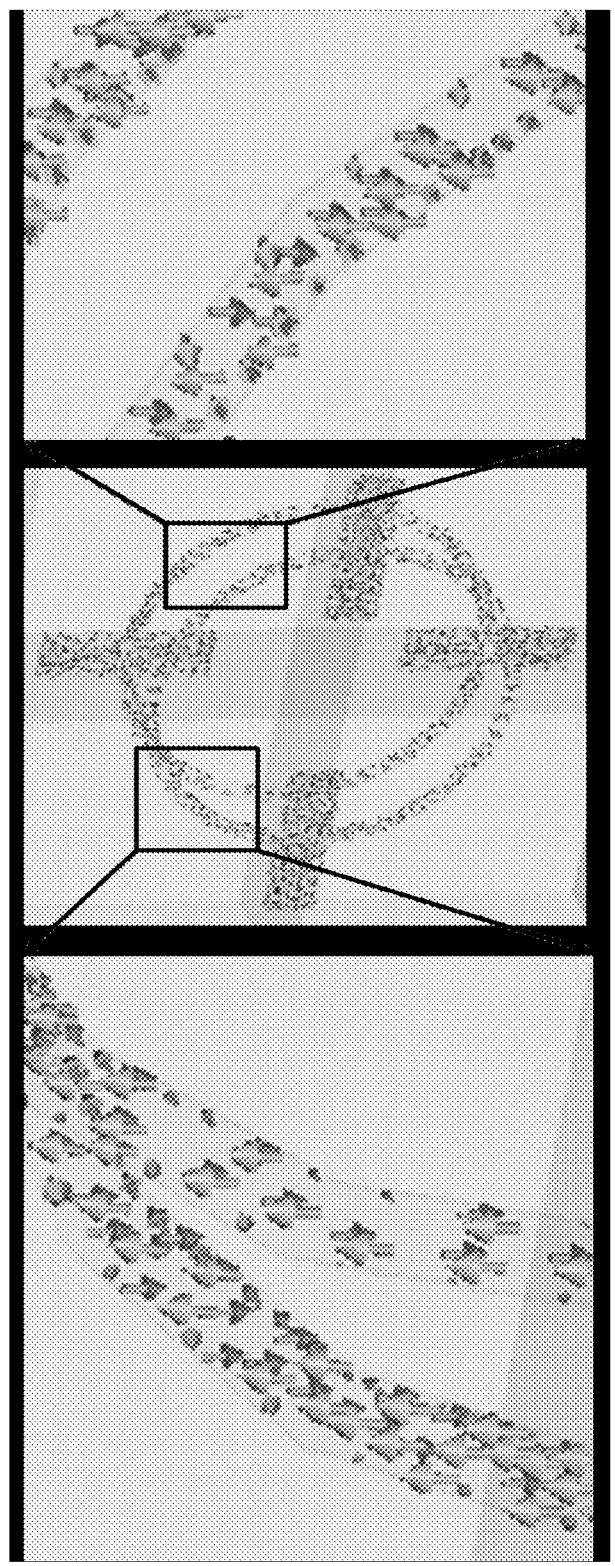
FIG. 12 is an illustration of the Zia metamaterial element currents calculated from the CST simulations, demonstrating the lack of a closed current loop.

As described above, group theory predicts bianisotropic behavior for a metamaterial with elements having $C_{2v}$ symmetry; however, no actual information is provided about either the existence of resonances or their location in the electromagnetic spectrum. In fact, the case could exist where no resonances are found in the effective medium regime (i.e., where the unit cell period $\ll \lambda_{incident}$), resulting in a design with no actual metamaterial behavior. To better understand why no resonances appeared for this design in the effective medium regime, the Zia element currents from the simulations, shown in FIG. 12, were compared with the mode predictions in FIG. 9. The calculated currents agree with the predictions as expected, and highlight the reason for the lack of resonance in the structure. As seen in FIG. 12, there is no current circulation around the Zia structure due to lack of return path for the current to form a closed loop. Instead, currents travel upwards on both sides of the structure to accumulate positive charges on the top during one half period, then travel downwards to accumulate positive charges at the bottom during the other half period.

Figure 13:
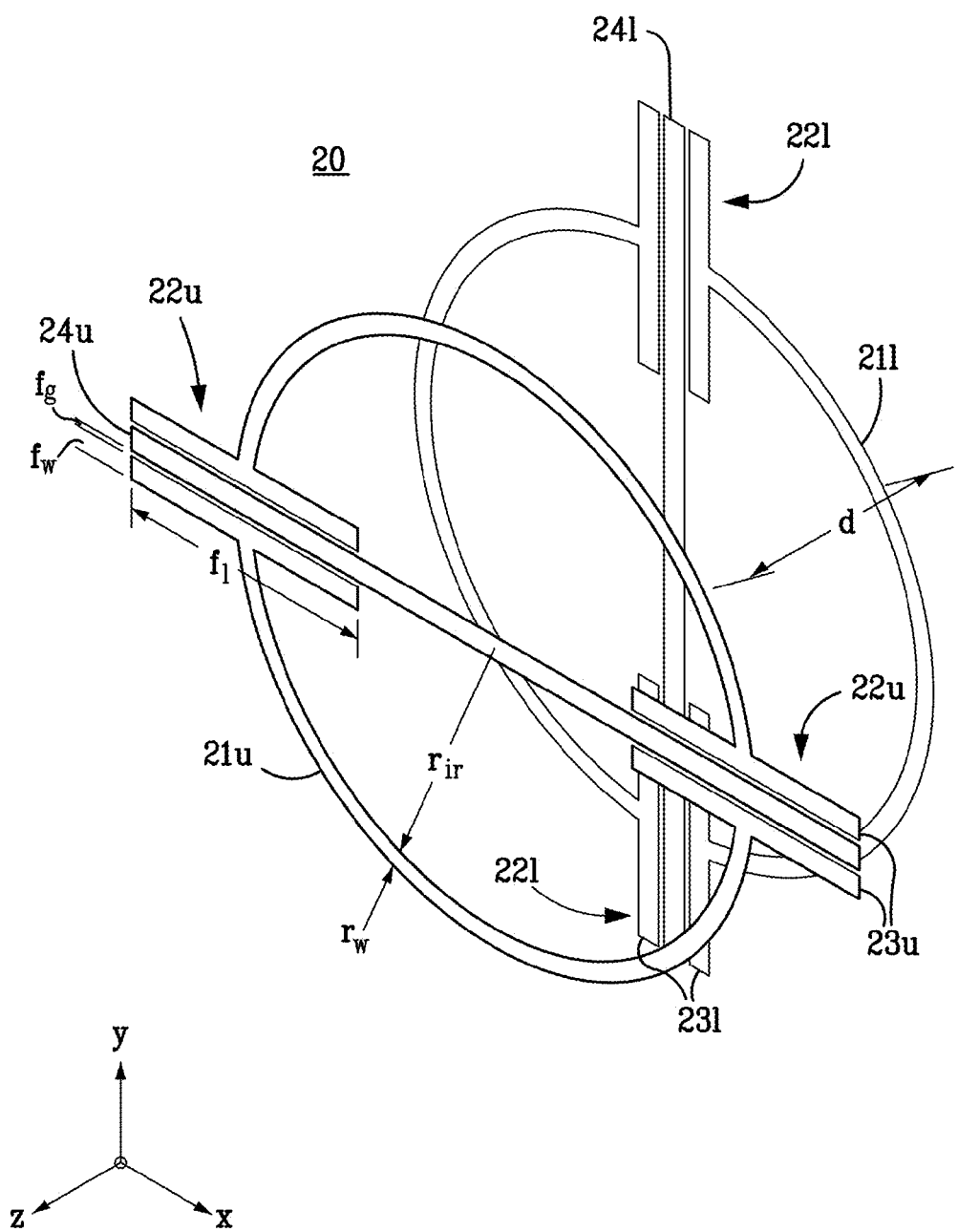
FIG. 13 is a schematic illustration of a modified Zia metamaterial element.

Thus, to achieve a net current flow while preserving the $C_{2v}$ symmetry, a bisecting rod can be added as illustrated by the modified Zia design shown in FIG. 13. The modified Zia metamaterial element 20 comprises an upper planar conducting ring 21$u$ with two opposing capacitive arms 22$u$ intersecting and oriented perpendicular to the ring 21$u$ with $C_2$ symmetry, and a lower conducting ring 21$l$ with two capacitive arms 22$l$ intersecting and oriented perpendicular to the ring 21$l$ with $C_2$ symmetry. The inner radius of the exemplary circular ring shown is $r_{ir}$. The radial width of the circular ring is $r_w$. The width of the opposing fingers of each capacitive arm is $f_w$. The length of each finger is $f_l$. The capacitive arms 22$u$ and 22$l$ can be centered on the ring (as shown), or can be positioned radially inward or outward to a side of the ring. Each of the rings can further comprise a bisecting conducting rod 24$u$ or 24$l$ that bisects the opposing fingers 23$u$ or 23$l$ of the opposing capacitive arms 22$u$ or 22$l$. The gap between the rod and the fingers is $f_g$. The upper ring and lower rings 21$u$ and 21$l$ are concentric, spaced apart from each other a distance d perpendicular to the planar direction, and rotated by an angle of 90° with respect to each other, thereby providing a metamaterial element with $C_{2v}$ symmetry.

In general, the upper and lower rings can have any geometry that will provide $C_2$ symmetry. For example, a square-ring geometry may be easier to simulate and fabricate. The upper and lower rings can have different radii or sides of different length and maintain $C_{2v}$ symmetry, as long as they remain concentric; however, this will generally weaken and broaden the resonant response of the metamaterial. In general, the rings can comprise any electrically conductive material. Metals are generally preferred for the metamaterial element, since they allow for well-defined currents and inductive paths. Highly-doped semiconductor materials can also be used, but generally suffer from higher loss. Further, a stackable three-dimensional metamaterial can be obtained by placing three pairs of such upper and lower rings centered on the opposing faces of a cube.

Figure 14:
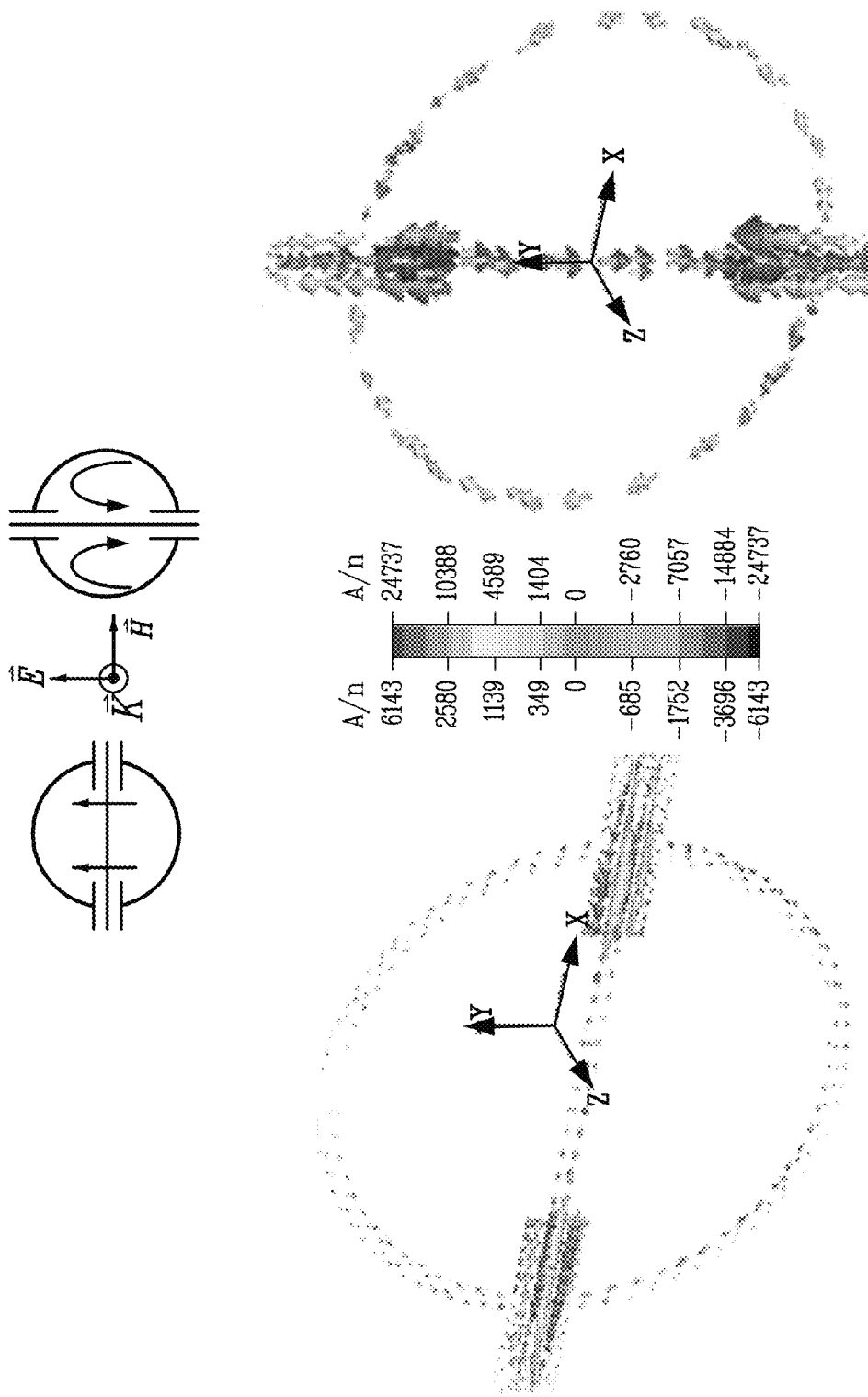
FIG. 14 is an illustration of the current paths in the modified Zia element, demonstrating the closed current path and central rod, which allows for coupling to an incident electric field that is parallel to the rod.

As shown in FIG. 14, the addition of the bisecting rod gives rise to two current loops. Currents are allowed to circulate by means of the capacitances provided by the fingers of the modified Zia design and can now be excited by an incident electric field via the central "antenna" rod, while the loop itself supplies a path for inductance and coupling to a magnetic field. Using this modified design, that provides both a capacitive path on the upper Zia ring and an inductive path on the lower ring, resonance is guaranteed with its location in frequency dependent only on the physical dimensions of the modified Zia, namely, the thicknesses and lengths of the fingers and rings, and the separations among the fingers and rings. It has been previously reported that an electric field that crosses the gaps (perpendicular to the gaps) is necessary to obtain a resonance. See N. Katsarakis et al., *Applied Physics Letters* 84 (15), 2943 (2004). However, this turns out to be highly dependent of the topology of the metamaterial element; resonant behavior is more dependent on symmetry of the paths parallel to the electric field than the orientation of the capacitive gaps. In fact, the existence and intensity of a resonance depends upon the shape of the paths that form the loop which the current flows around. If a closed path that is asymmetric with respect to the electric field can be found, a current will flow around it; and if a gap (or capacitance) exists along the path, a resonance, and hence metamaterial behavior, is possible. Thus, a resonance can be observed despite the fact that the electric field is oriented parallel to the capacitive gaps instead of crossing them. This effect explains the appearance of currents on the right (lower) ring in FIG. 14 and not on the left (upper) ring.

The values of the four constitutive relations of the Zia metamaterial were obtained using a retrieval code that was developed to extract these values from the calculated S-parameters. Since it is assumed that the Zia metamaterial element is generally bianisotropic, a simple isotropic retrieval code is not suitable. Thus, a code was developed that is able to recover the refractive index n and the input impedance Z for both directions of propagation, as long as they are perpendicular to the faces of the metamaterial. This is significant because although the Zia metamaterial element is reciprocal and thus has identical forward and backward refractive indices, the forward and backward wave impedances need not be the same. The impedance and can be calculated directly as:

$$\mp Z_\pm = \frac{-(r_+ - r_-) \pm \sqrt{(r_+ - r_-)^2 + [(1-r_+)(1-r_-) - t_- t_+][(1+r_-)(1+r_+) - t_- t_+]}}{(1-r_+)(1-r_-) - t_- t_+}, \quad (5)$$

where t refers to transmission coefficients and r refers to reflection coefficients, and the refractive index can be found through the relationship:

$$\cos(kn_\pm d) = \frac{1}{2}\left[\frac{(1 \pm Z_\pm)t_-}{1 + r_- \pm Z_\pm(1 - r_-)} + \frac{(1 \mp Z_\pm)t_+}{1 + r_+ \mp Z_\pm(1 - r_+)}\right], \quad (6)$$

where k is the wave number and d is the thickness of the metamaterial layer; care should be taken to ensure that the correct branch is chosen when inverting the cosine function. The transmission and reflection coefficients are directly related to the S-parameters as $t_-=S_{12}$, $t_+=S_{21}$, $r_+=S_{11}$, and $r_-=S_{22}$. The constitutive parameters $\epsilon_{xx}$, $\mu_{zz}$, $\xi_{xy}$, and $\zeta_{yx}$ can be found for a wave with perpendicular incidence from the impedance and refractive index as:

$$\varepsilon_r = \frac{n_+ + n_-}{Z_+ + Z_-} \quad (7)$$

$$\mu_r = \frac{n_+ + n_-}{Z_+ + Z_-} Z_+ Z_- \quad (8)$$

$$\xi_{xy} = \frac{\sqrt{\mu_0 \varepsilon_0}}{2}\left[(n_+ - n_-) - \left(\frac{Z_+ - Z_-}{Z_+ + Z_-}\right)(n_+ + n_-)\right] \quad (8)$$

$$\zeta_{xy} = \frac{\sqrt{\mu_0 \varepsilon_0}}{2}\left[(n_+ - n_-) + \left(\frac{Z_+ - Z_-}{Z_+ + Z_-}\right)(n_+ + n_-)\right], \quad (8)$$

where $\mu_0$ is the free-space permeability and $\epsilon_0$ is the free-space permittivity.

Figure 15A:
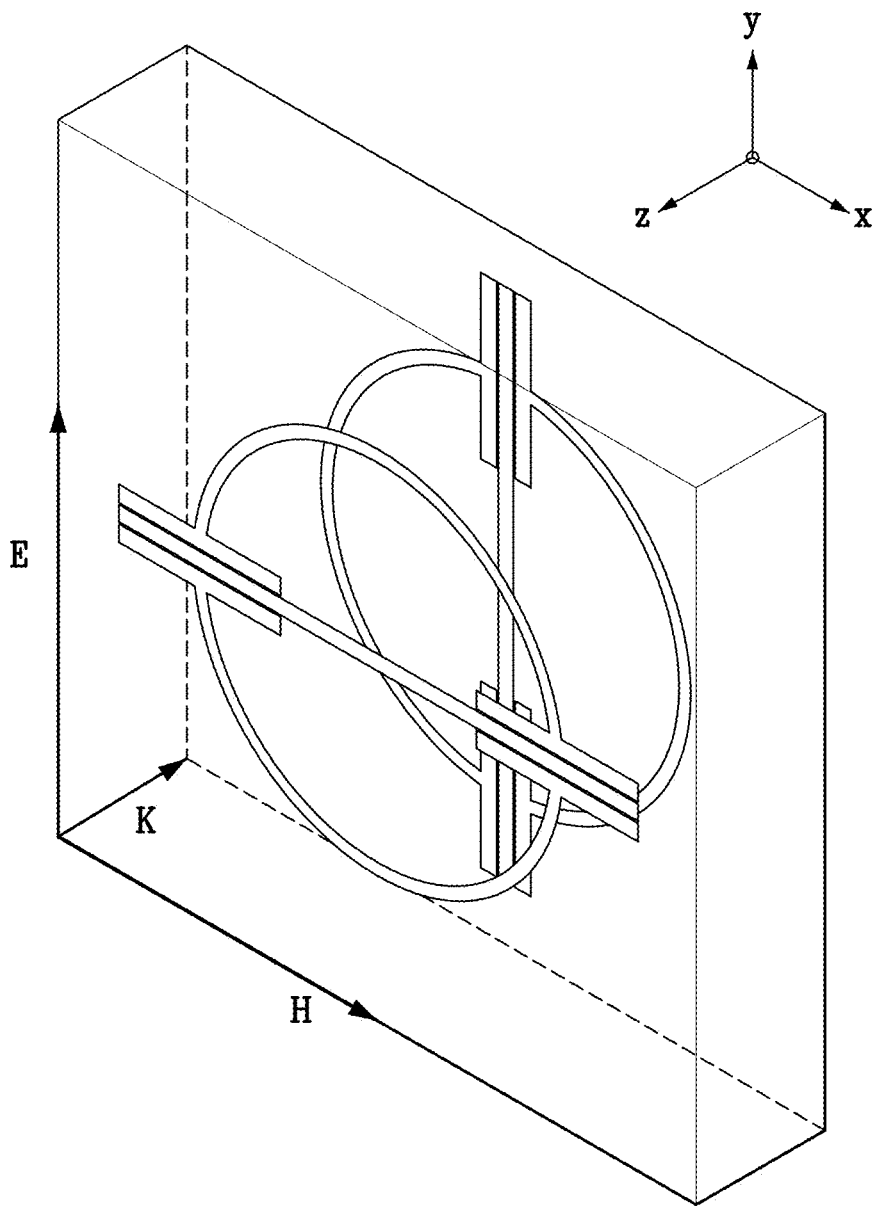
FIG. 15(a) is a schematic illustration of a modified Zia element with an excitation at normal incidence.
Figure 15B:
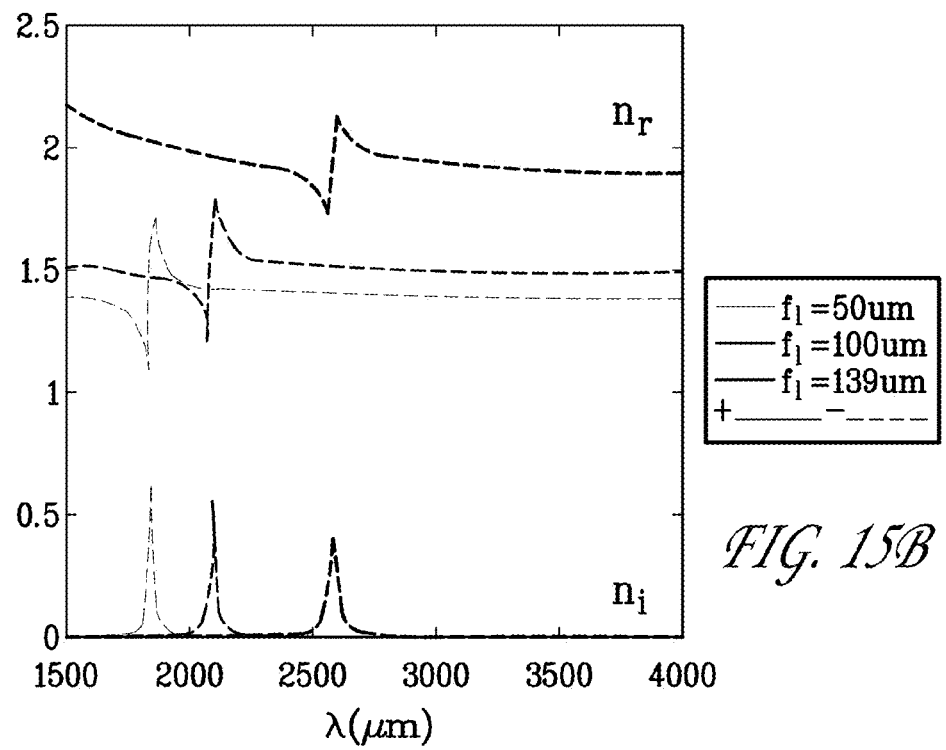
FIG. 15(b) is a graph of the frequency response of the refractive index and FIG. 15(c) is a graph of the frequency response of the impedance as $f_l$ is varied from 50 µm to 139 µm with $r_{ir}$=125 µm and d=50 µm.
Figure 15C:
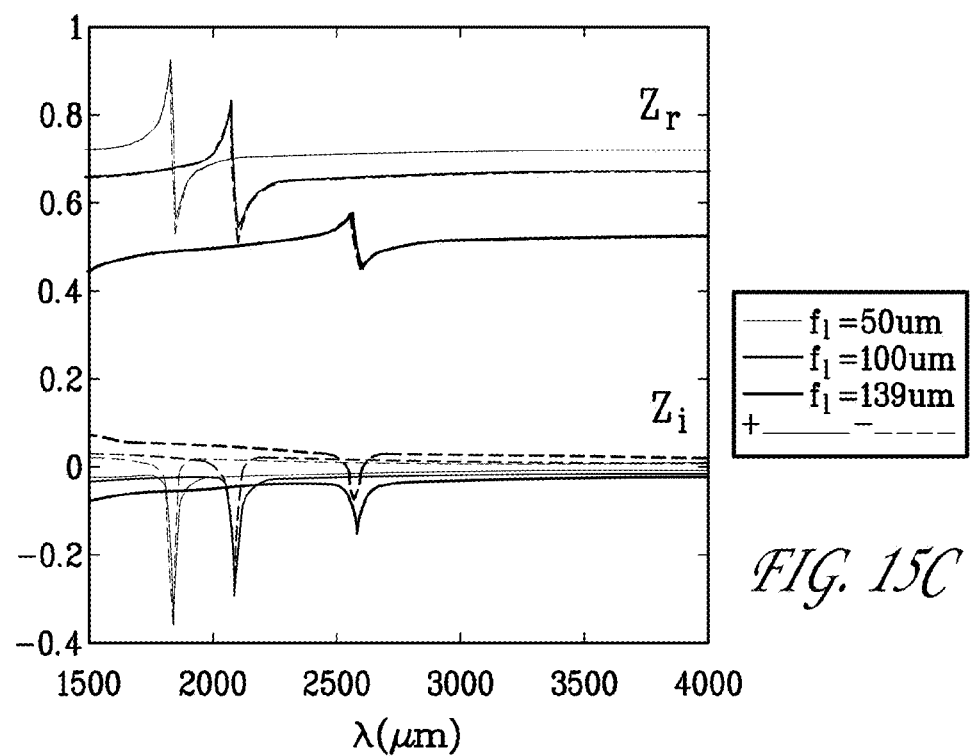
Figure 15D:
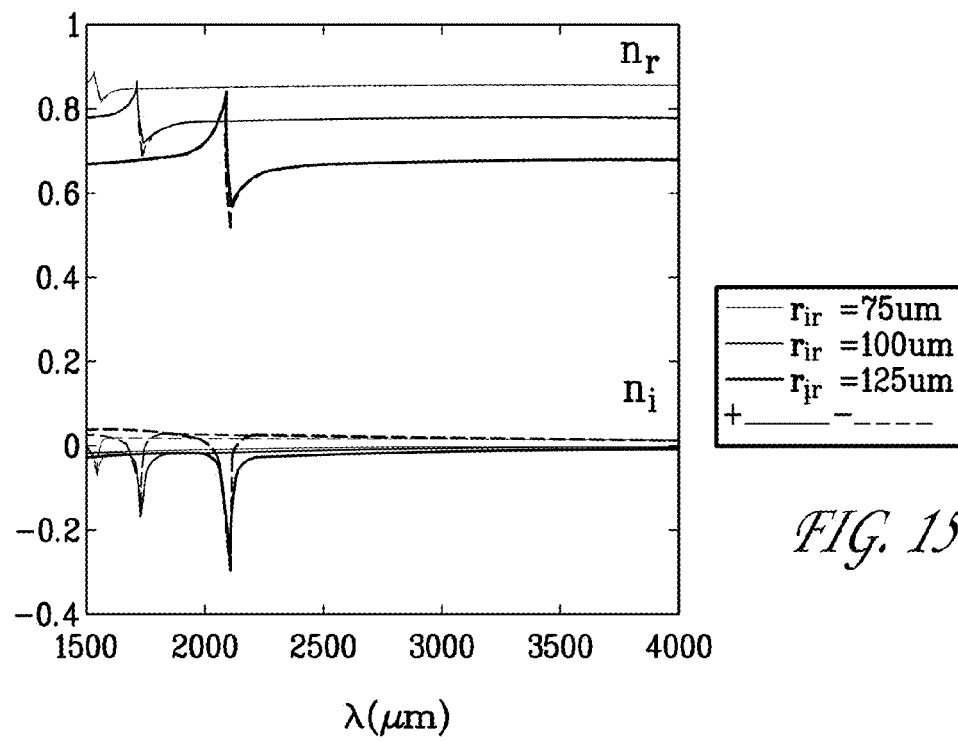
FIG. 15(d) is a graph of the frequency response of the refractive index and FIG. 15(e) is a graph of the frequency response of the impedance as $r_{ir}$ is varied from 75 µm to 125 µm with $f_l$=100 µm and d=50 µm.
Figure 15E:
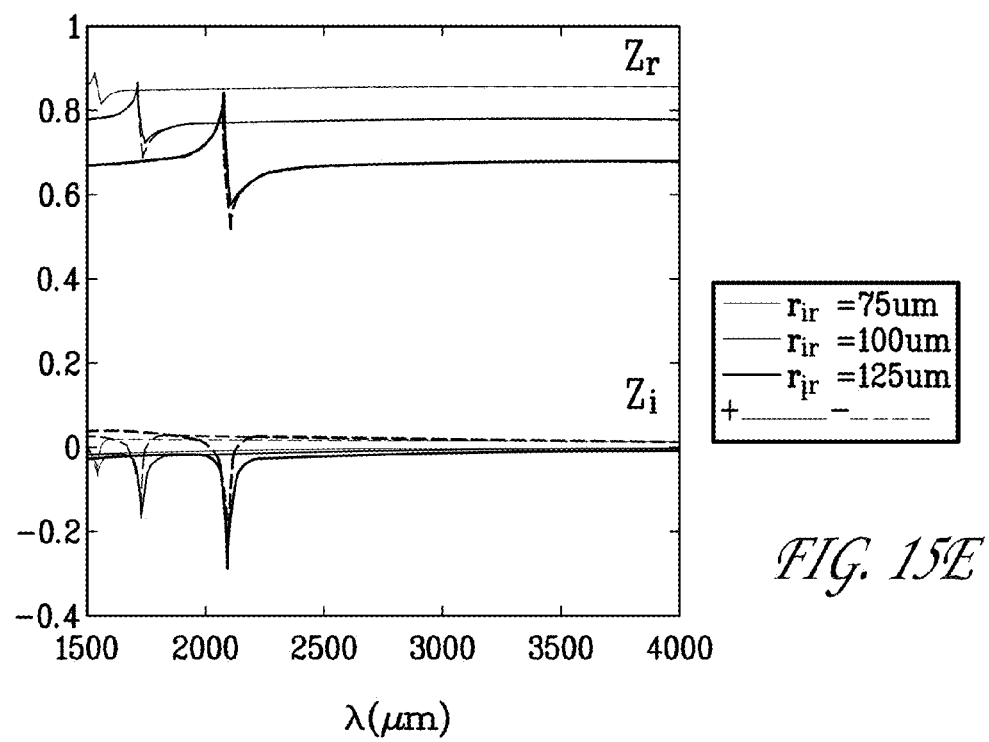
Figure 15F:
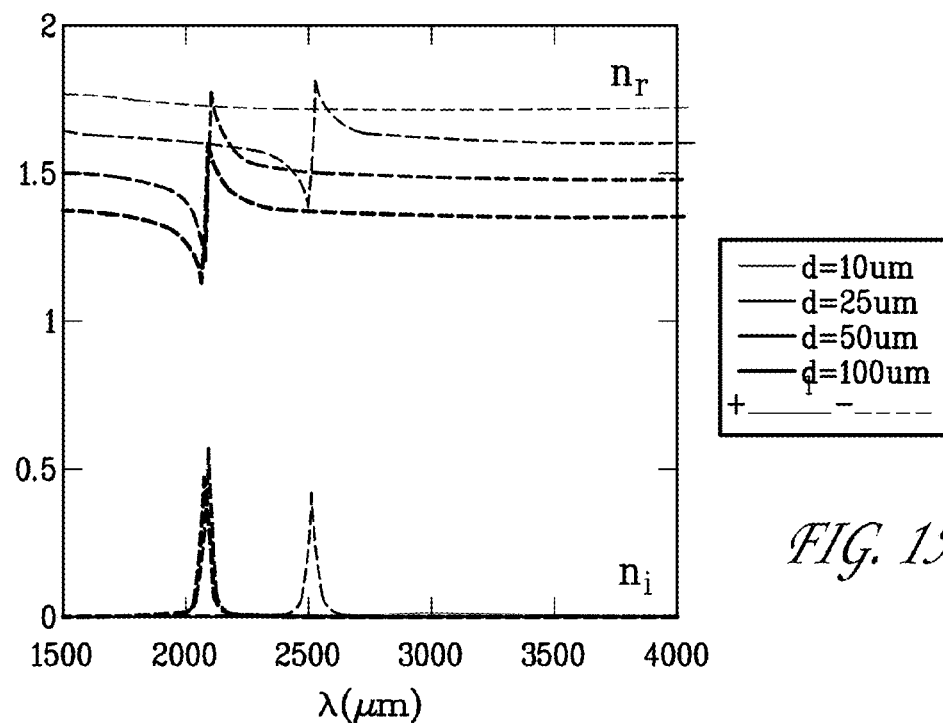
FIG. 15(f) is a graph of the frequency response of the refractive index and FIG. 15(g) is a graph of the frequency response of the impedance as d is varied from 10 µm to 100 µm with $f_l$=100 µm and $r_{ir}$=125 µm.
Figure 15G:
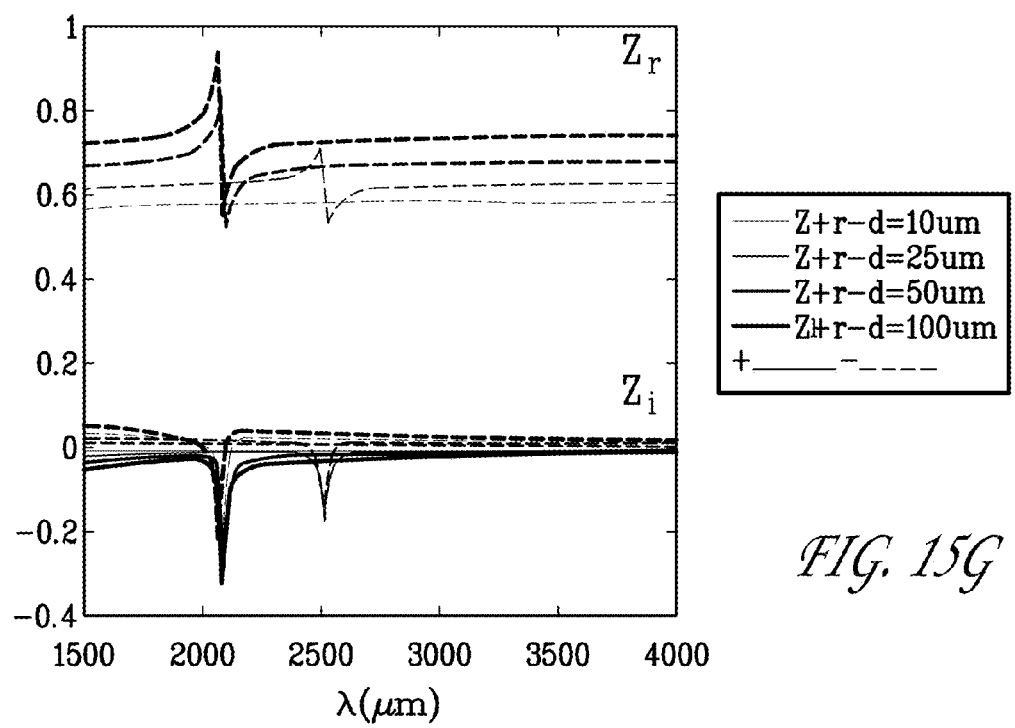

A series of CST simulations were run to study the topological scaling behavior of the modified Zia design and verify that resonances occur as expected due to the asymmetry of the current paths parallel to the electric field. The values of the constitutive parameters were calculated using the retrieval code for each topology. First, an excitation at perpendicular incidence was used to probe the bianisotropic character of the modified Zia design, as shown in FIG. 15(a), with the values of $f_l$, $r_{ir}$, and d (see FIG. 13) scaled independently from their initial values of 100 µm, 125 µm, and 50 µm, respectively. Resonant behavior is clearly evident in the refractive index (FIGS. 15(b), (d), and (f)) and impedance (FIGS. 15(c), (e), and (g)) response of the metamaterial. The refractive index increases as expected as $f_l$ is increased from 50 µm to 139 µm (FIG. 15(b)), since increasing the finger length effectively increases the capacitance of the Zia ring. Correspondingly, the impedance, being inversely proportional to the capacitance, decreases as $f_l$ is increased (FIG. 15(c)). The wavelength is proportional to the capacitance as well as the inductance, and thus increases with increasing $f_l$ (FIGS. 15(b) and (c)), and as $r_{ir}$ is increased from 75 µm to 125 µm (FIGS. 15(d) and (e)), since increasing Zia ring radius effectively increases the inductance of the metamaterial. In addition, the retrieved values in each figure are plotted for normal incidence from both the top (solid curves) and the bottom (dashed curves), demonstrating the reciprocal nature of this metamaterial. No resonance appears for d=10 µm, and saturation of the tuning seen for d>50 µm (FIGS. 15(f) and (g)). However, the resonant frequency shifts in the opposite direction as d is increased as $f_l$ or $r_{ir}$, indicating that the separation between the Zia rings can be used as a tuning parameter with opposite behavior from the other design parameters yielding an added degree of freedom for tuning.

Figure 16A:
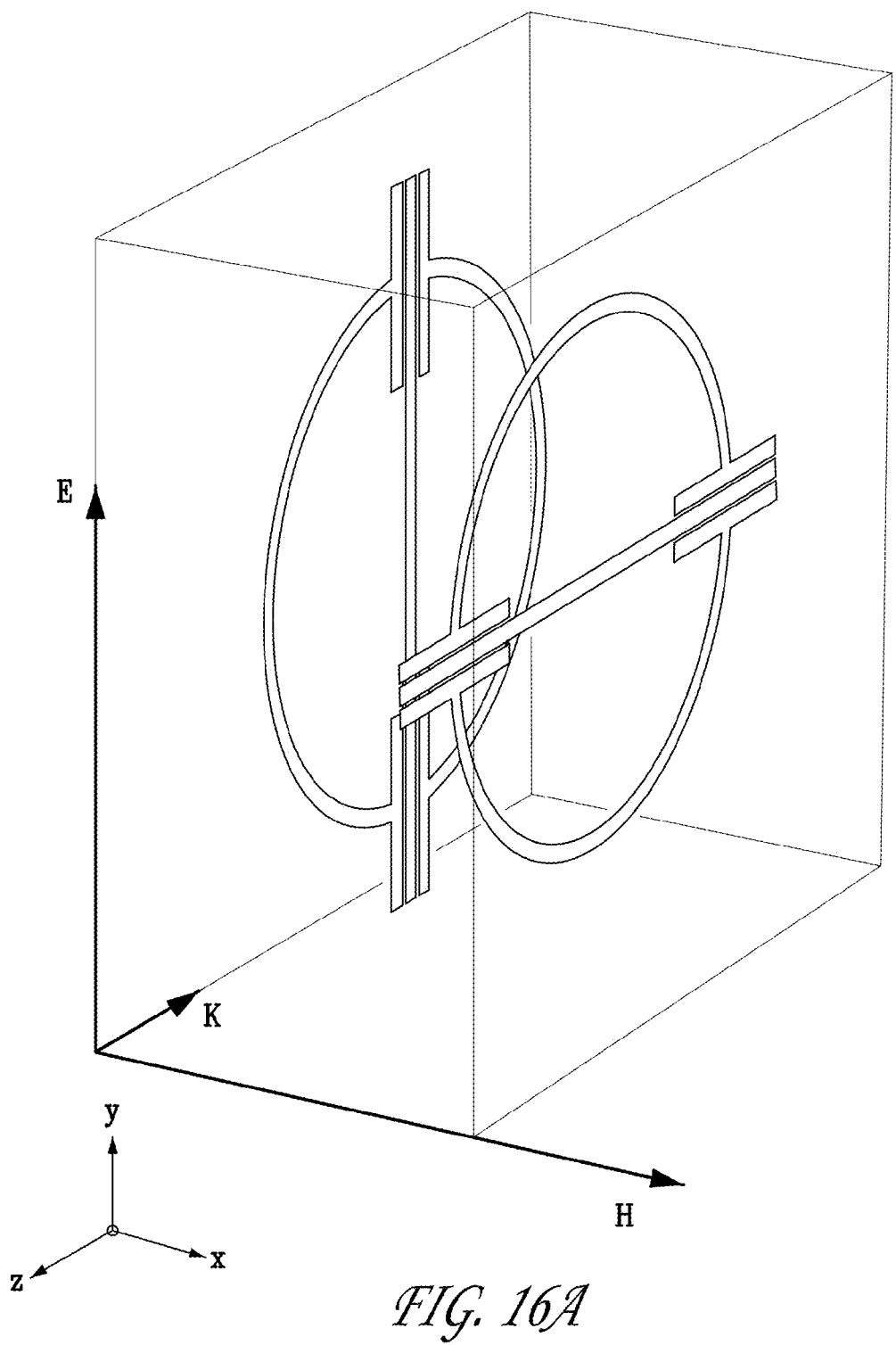
FIG. 16(a) is a schematic illustration of the modified Zia element with an excitation at parallel incidence.
Figure 16B:
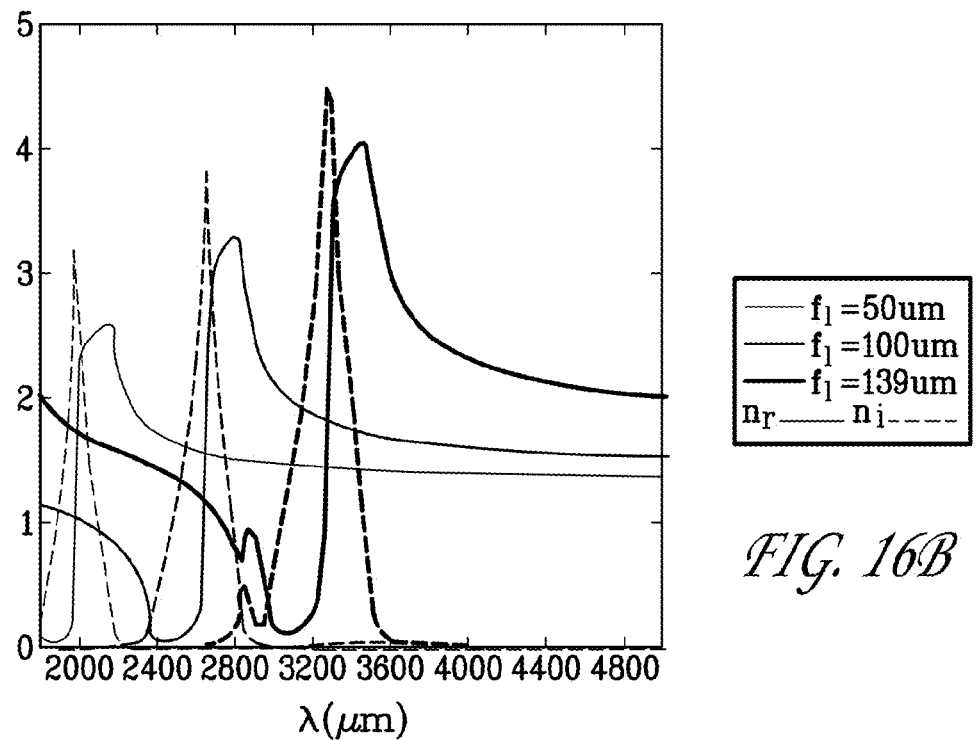
FIG. 16(b) is a graph of the frequency response of the refractive index and FIG. 16(c) is a graph of the frequency response of the impedance as $f_l$ is varied from 50 µm to 139 µm with $r_{ir}$=125 µm and d=50 µm.
Figure 16C:
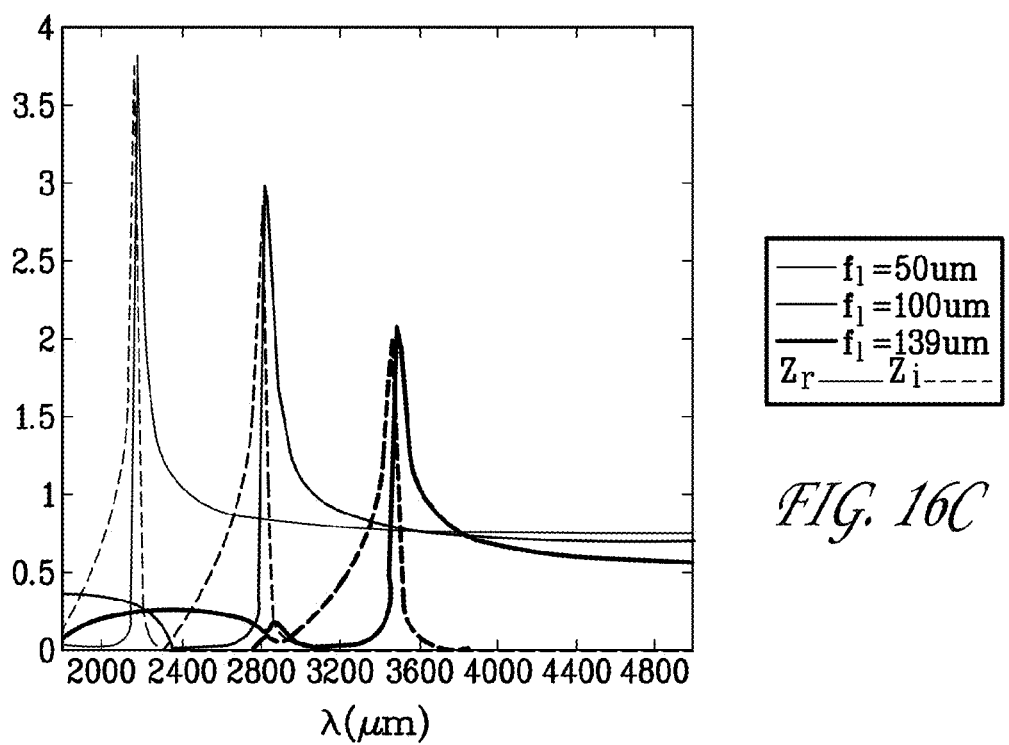
Figure 16D:
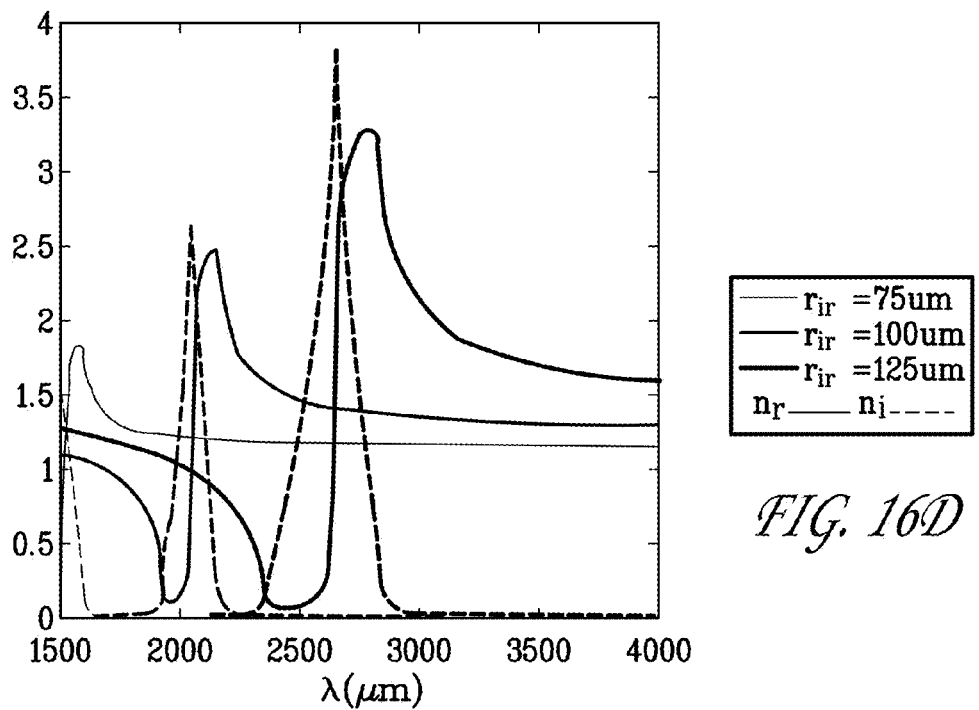
FIG. 16(d) is a graph of the frequency response of the refractive index and FIG. 16(e) is a graph of the frequency response of the impedance as $r_{ir}$ is varied from 75 µm to 125 µm with $f_l$=100 µm and d=50 µm.
Figure 16E:
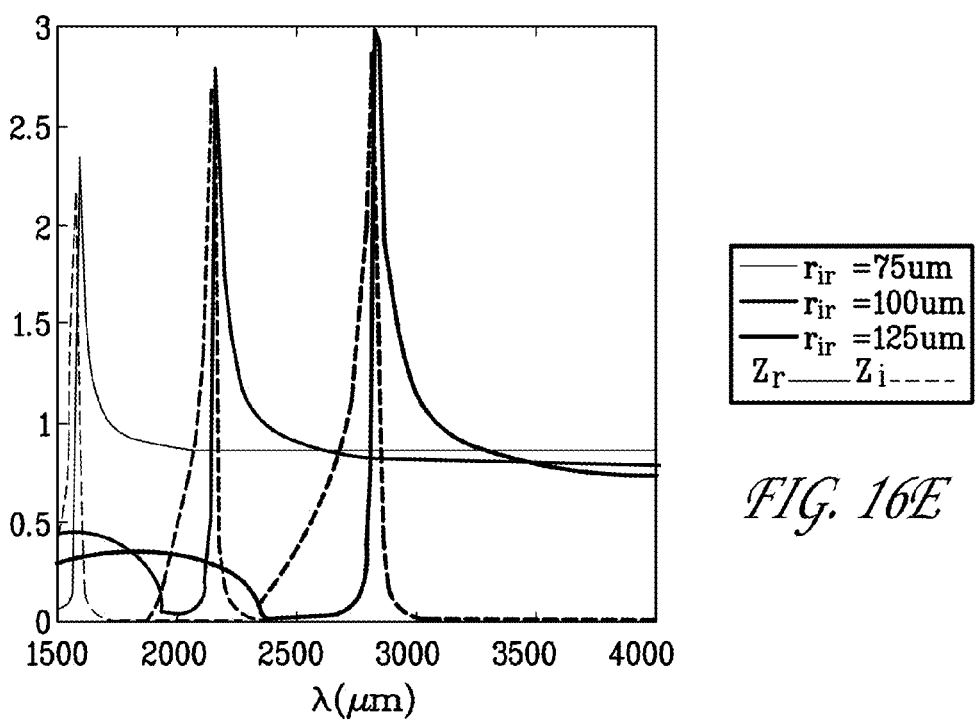
Figure 16F:
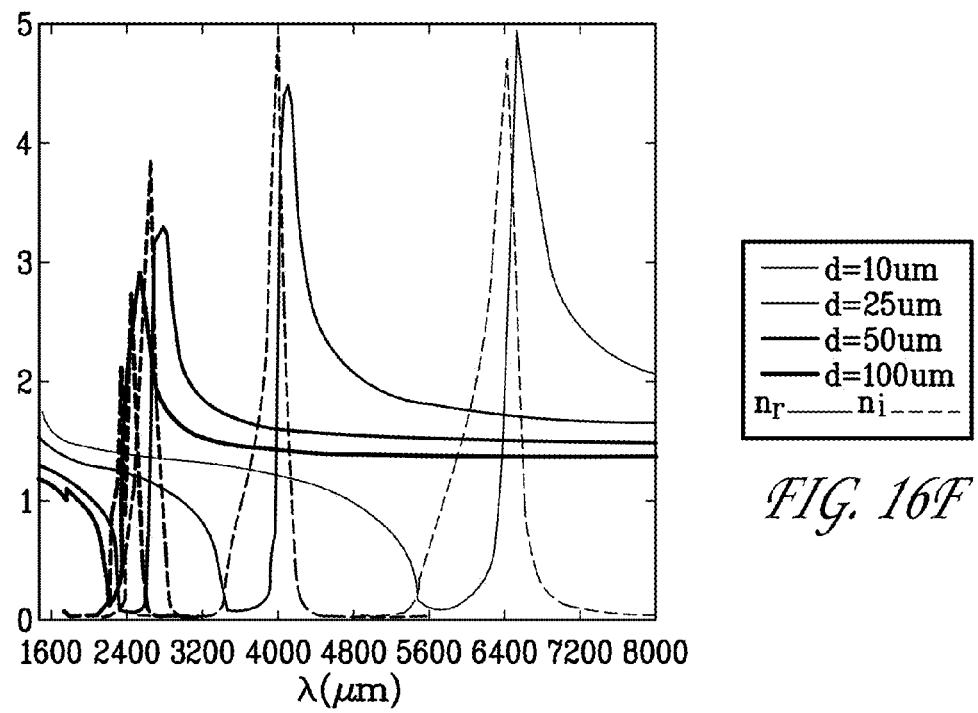
FIG. 16(f) is a graph of the frequency response of the refractive index and FIG. 16(g) is a graph of the frequency response of the impedance as d is varied from 10 µm to 100 µm with $f_l$=100 µm and $r_{ir}$=125 µm.
Figure 16G:
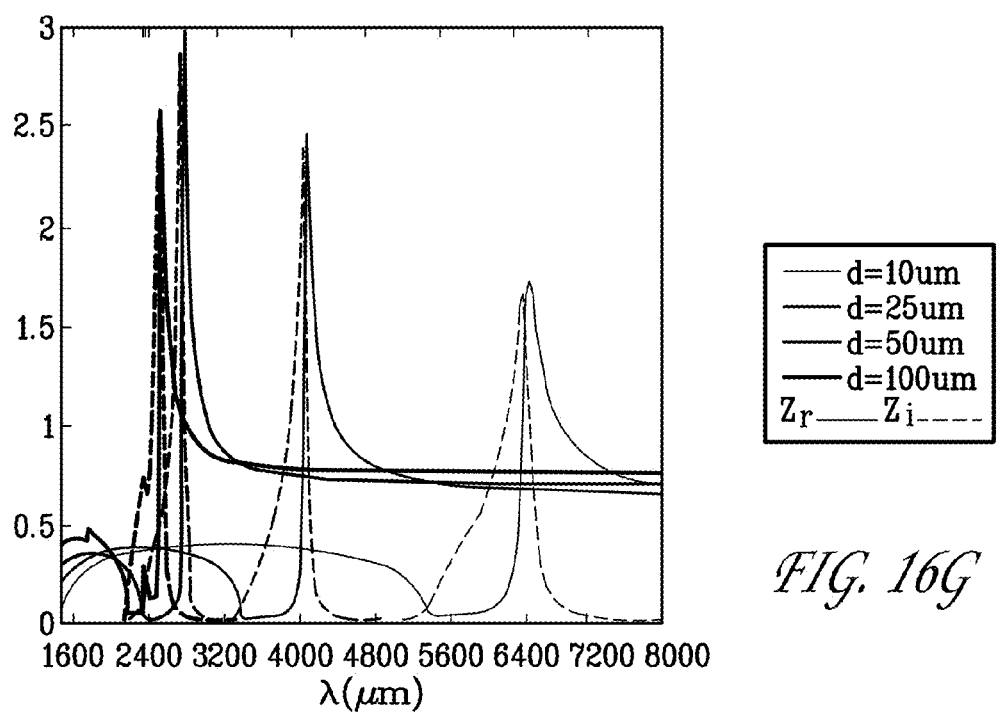

Next, the same parameter sweeps were performed with the excitation parallel to the plane of the modified Zia rings, as shown in FIG. 16(a). Resonant behavior is again observed, with much larger shifts in the resonant frequency as the topological parameters are changed, particularly for d (FIGS. 16(f) and (g)), where resonant behavior is seen for all values. The refractive index and impedance values exhibit similar tuning, although with significantly larger magnitudes, most notable the imaginary parts. Also, the inductive coupling is now much stronger due to the alignment of the magnetic field perpendicular to the plane of the Zia rings, resulting in larger refractive index and impedance values and an increasing trend as $r_{ir}$ is increased (FIG. 16(e)). The shift in resonant wavelength with d again appears to saturate above d=50 µm (FIGS. 16(f) and (g)), but has a stronger effect due the orientation. This again offers an additional degree of freedom in tuning the behavior of the metamaterial, and effectively relaxes the constraints for fabrication, since the resonant frequency can be shifted over a relatively large range without having to change the period of the metamaterial.

Figure 17A:
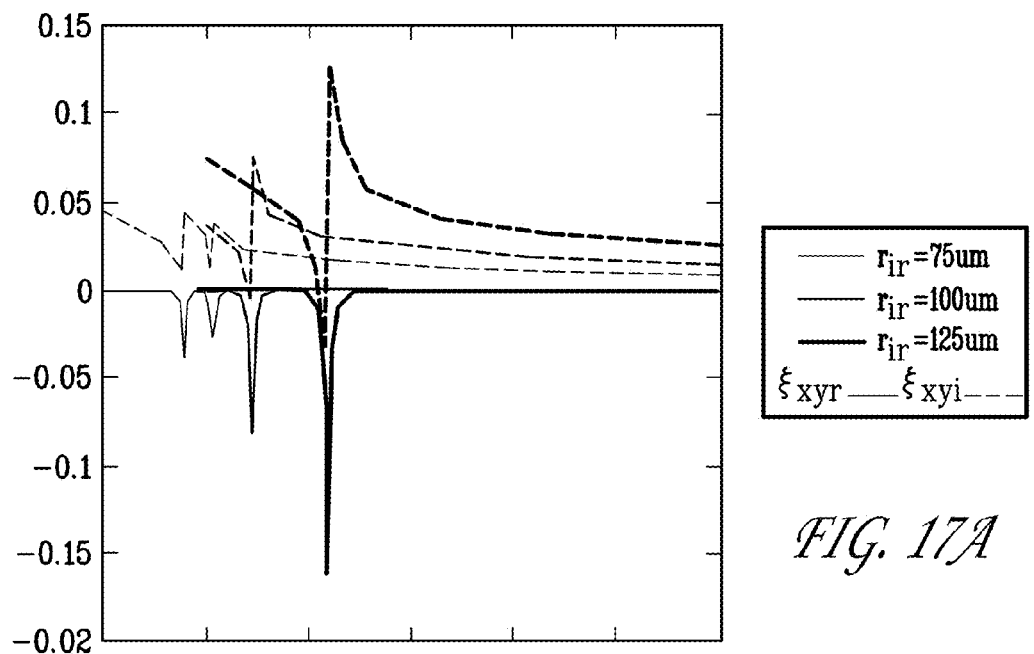
FIG. 17(a) is a graph of the frequency response of $\xi_{xy}$.
Figure 17B:
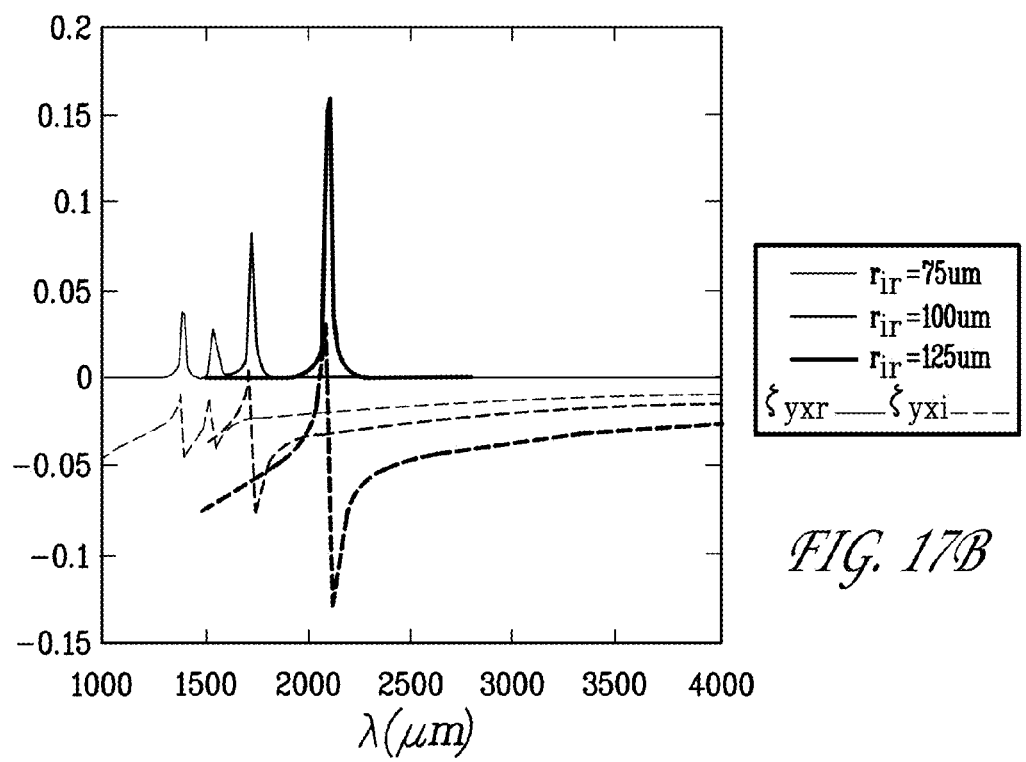
FIG. 17(b) is a graph of the frequency response of $\zeta_{yx}$ for the modified Zia element with normal incidence as $r_{ir}$ is varied from 75 µm to 125 µm with $f_l$=100 µm and d=50 µm.
Figure 17C:
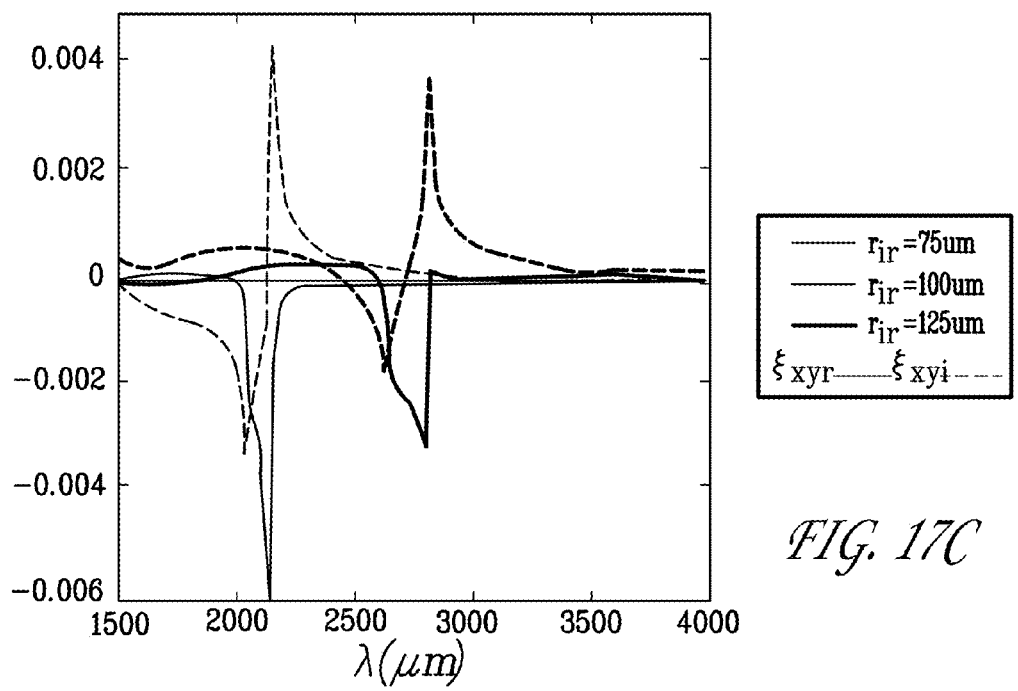
FIG. 17(c) is a graph of the frequency response of $\xi_{xy}$.
Figure 17D:
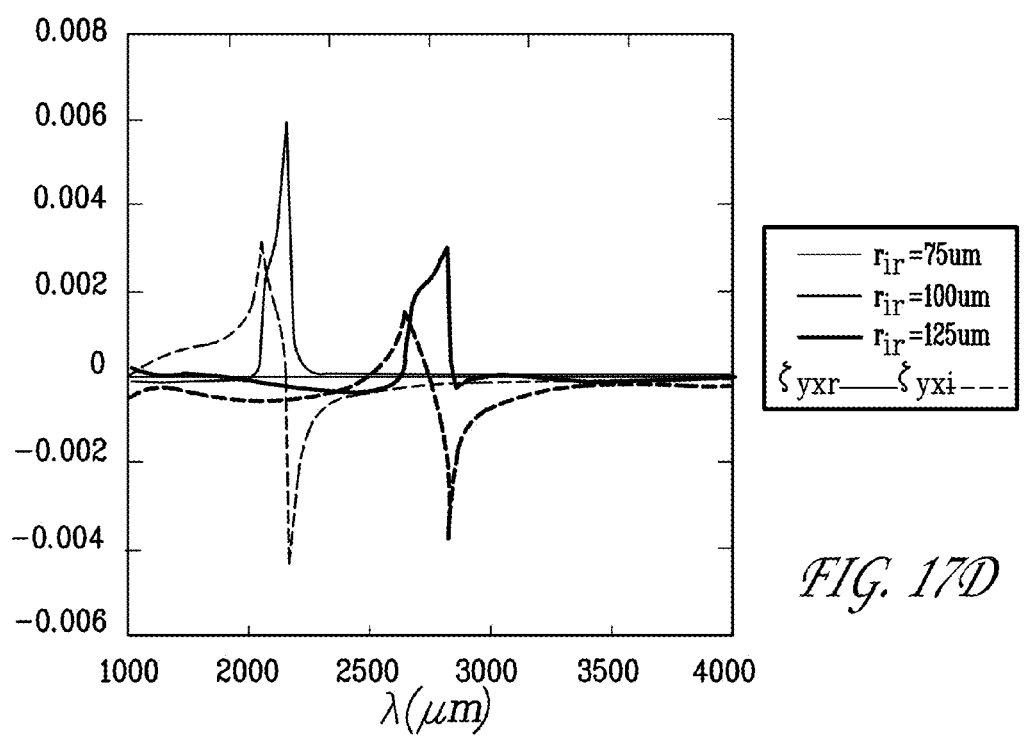
FIG. 17(d) is a graph of the frequency response of $\zeta_{yx}$ for the modified Zia element with parallel incidence as $r_{ir}$ is varied from 75 µm to 125 µm with $f_l$=100 µm and d=50 µm.

Since group theory predicts bianisotropic behavior only for perpendicular incidence, it is also possible to verify the model by checking for the absence of bianisotropic response for parallel incidence. Thus, $\xi_{xy}$, and $\zeta_{yx}$ were calculated for various values of $r_{ir}$ for both perpendicular (FIGS. 17(a) and (b), respectively) and parallel (FIGS. 17(c) and (d), respectively) excitation. Although at first glance there appears to be resonant behavior for parallel incidence, the parameter values are nearly two orders of magnitude smaller than the corresponding values for perpendicular incidence, thus confirming the lack of bianisotropy. The wavelength again increases with $r_{ir}$, as well as $\xi_{xy}$, and $\zeta_{yx}$, being the directly proportional to the impedance.

The addition of the bisecting rod resulted in a clear resonance within the effective medium regime of the metamaterial, which confirms the necessity of a return path for the currents to form a closed loop. The metamaterial behavior is clearly demonstrated by the artificial values of permittivity and permeability obtained, as evidenced by the artificial indices of refraction that vary over a range as large as 0.1<n<5 for both perpendicular and parallel incidence.

Design of a Chiral Metamaterial

In addition to bianisotropic behavior, metamaterials exhibiting chiral behavior have elicited much interest. In such materials, the direction of polarization of linearly polarized light is rotated as the beam propagates through the material, or alternatively, left circular polarized light will have a different transmission coefficient through the material than right circular polarized light.

An example of an electromagnetic constitutive relationship for a chiral material is given in Eq. (5), from which it can be deduced that the corresponding symmetry group must have $r_i, R_i$ modes, i.e., $r_x$, $R_x$, $r_y$, $R_y$, and $r_z$, $R_z$.

$$\begin{bmatrix} \bar{\bar{\varepsilon}} & \bar{\bar{\xi}} \\ \bar{\bar{\zeta}} & \bar{\bar{\mu}} \end{bmatrix} = \begin{bmatrix} \varepsilon_{xx} & 0 & 0 & \xi_{xx} & 0 & 0 \\ 0 & \varepsilon_{yy} & 0 & 0 & \xi_{yy} & 0 \\ 0 & 0 & \varepsilon_{zz} & 0 & 0 & \xi_{zz} \\ \varepsilon_{xx} & 0 & 0 & \mu_{xx} & 0 & 0 \\ 0 & \xi_{yy} & 0 & 0 & \mu_{yy} & 0 \\ 0 & 0 & \xi_{zz} & 0 & 0 & \mu_{zz} \end{bmatrix}. \quad (5)$$

Figure 18:
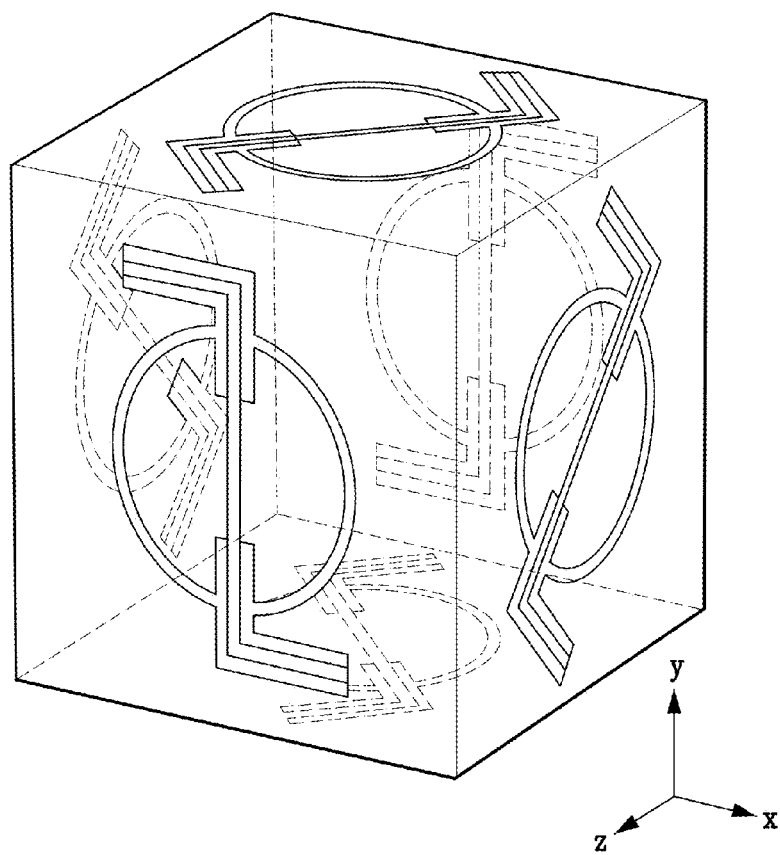
FIG. 18 shows the character table of the $D_2$ group, the simplest symmetry group that fits the necessary specifications for a chiral metamaterial, and a corresponding element design based on the Zia ring.

The simplest symmetry group that fits the necessary specifications is $D_2$; the character table of this group is shown on the left in FIG. 18.

Figure 19:
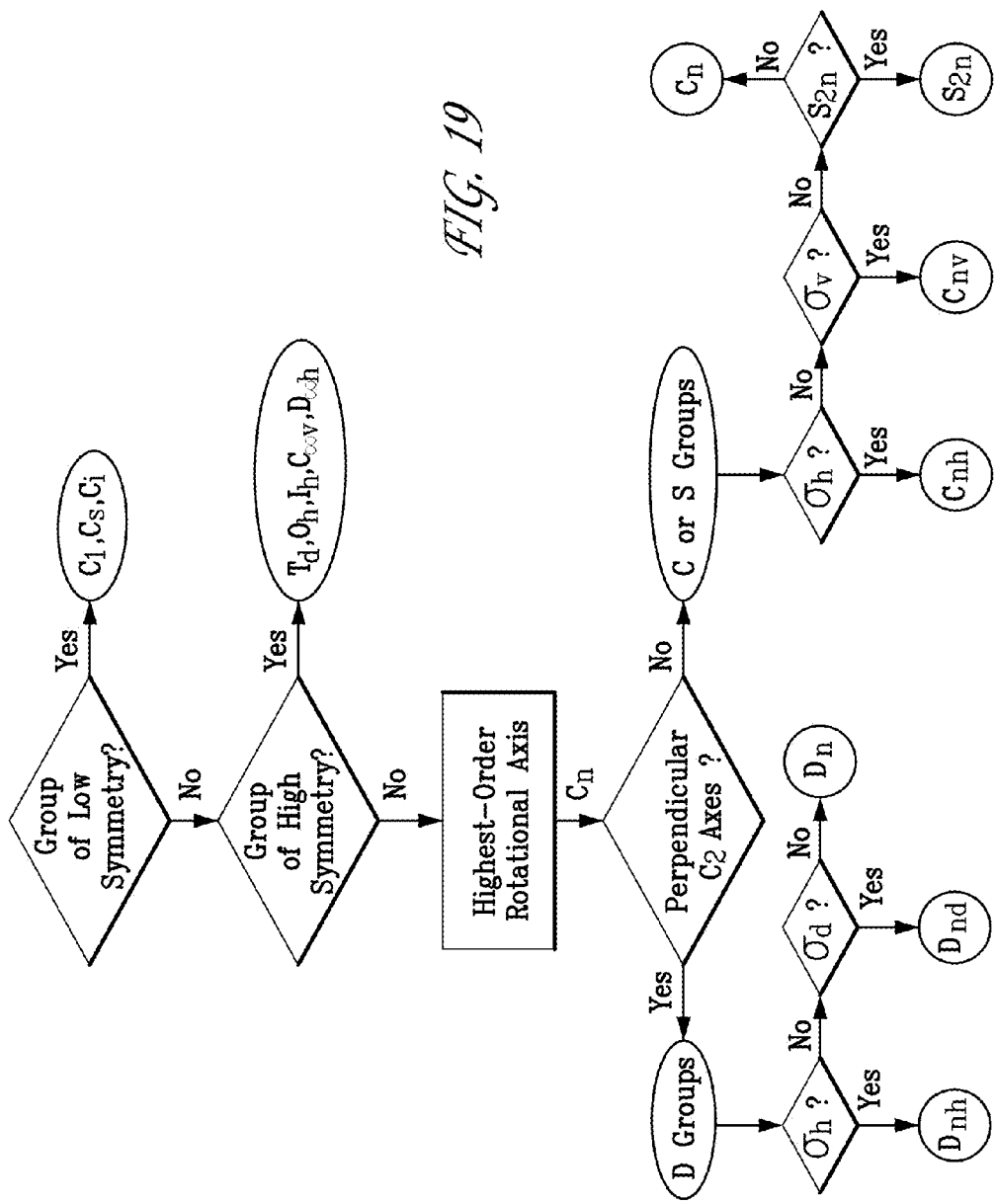
FIG. 19 shows the decision chart used to design a suitable metamaterial element belonging to this group a given symmetry group.

To design a suitable metamaterial element belonging to this group, one can start with the Zia element and follow the decision chart shown in FIG. 19. The simple Zia element is immediately excluded from the first two sets of groups, those of low and high symmetry. Since a cube element topology is desired to enable stacking for a complete three-dimensional metamaterial, the Zia elements can be placed on the six faces of a cube with the rods of opposing elements aligned in parallel. However, the $C_3$ axes inherent in the cube geometry must be broken to avoid the high symmetry groups; this can be done by rotating the Zia rings on the faces perpendicular to the x- and y-directions by 45° (any value between 0° and 90° can be chosen for this angle) in alternating directions, as shown on the right in FIG. 18. The highest-order rotation axis is now a $C_2$ axis, and since D group symmetry is desired, at least one other perpendicular $C_2$ axis was preserved. Next, any horizontal mirror planes are eliminated to avoid the $D_{nh}$ groups, while maintaining a perpendicular $C_2$ axis. This can be achieved by adding bends (e.g., 90°) to the extended fingers of the Zia design in opposite directions top and bottom, as shown on the right in FIG. 18, thus restoring the perpendicular rotation axes without adding any mirror symmetry planes. This final design clearly does not have a diagonal mirror symmetry plane, thus satisfying the requirements for the $D_2$ symmetry group. As shown in the character table in FIG. 18, chiral behavior requires the activity of all of the B modes (i.e., $B_1$, $B_2$, and $B_3$). Following the approach outlined in the previous section, a calculation of the reducible representation of this Zia metamaterial element, $\Gamma = 3A_1 + 5B_1 + 5B_2 + 5B_3$, indicates that all four modes are active and thus chiral behavior is possible.

Figure 20:
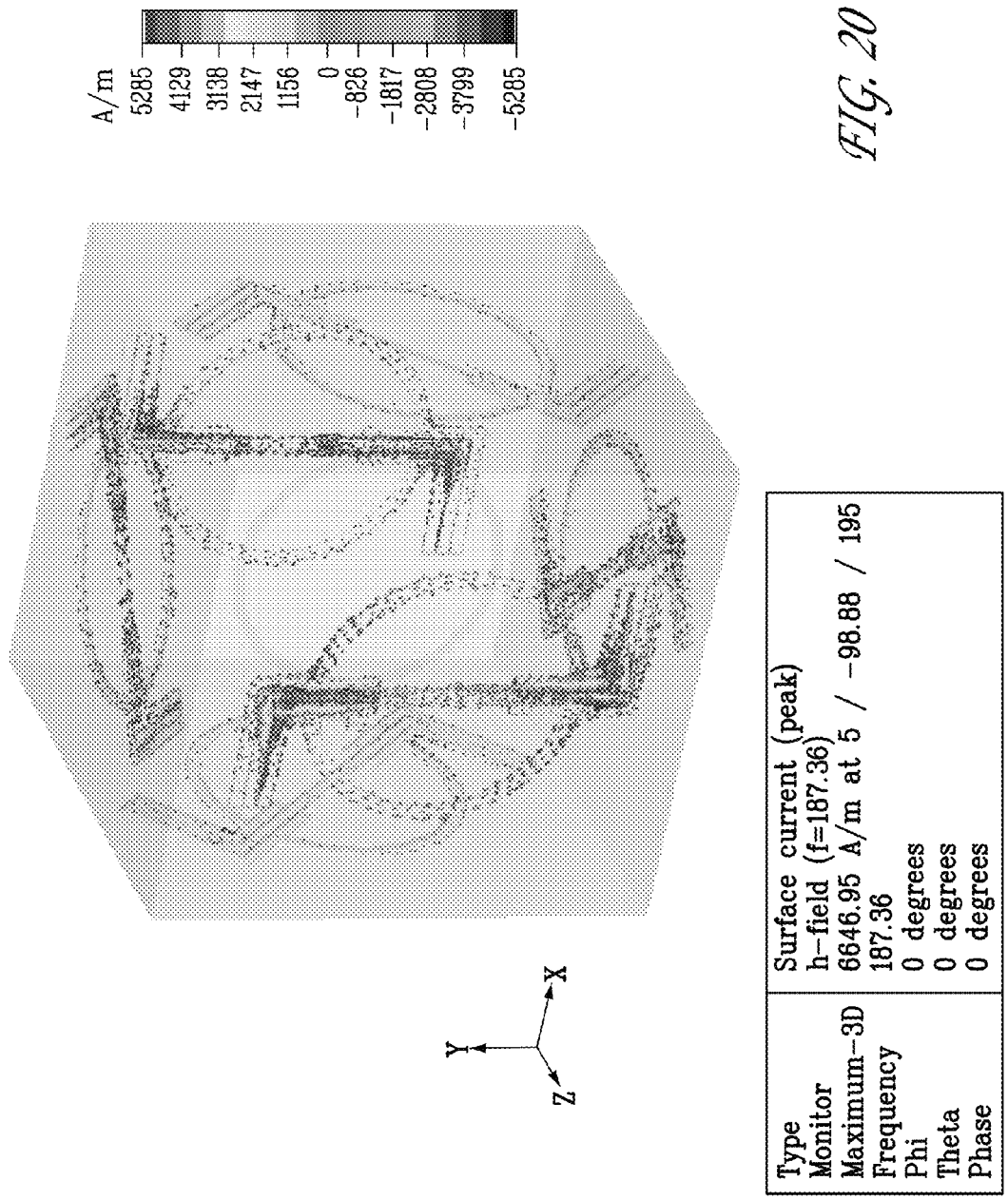
FIG. 20 shows a field plot of electrical current on the chiral metamaterial elements, verifying that the Zia elements are in fact excited by left or right circular polarized incident radiation.
Figure 21:
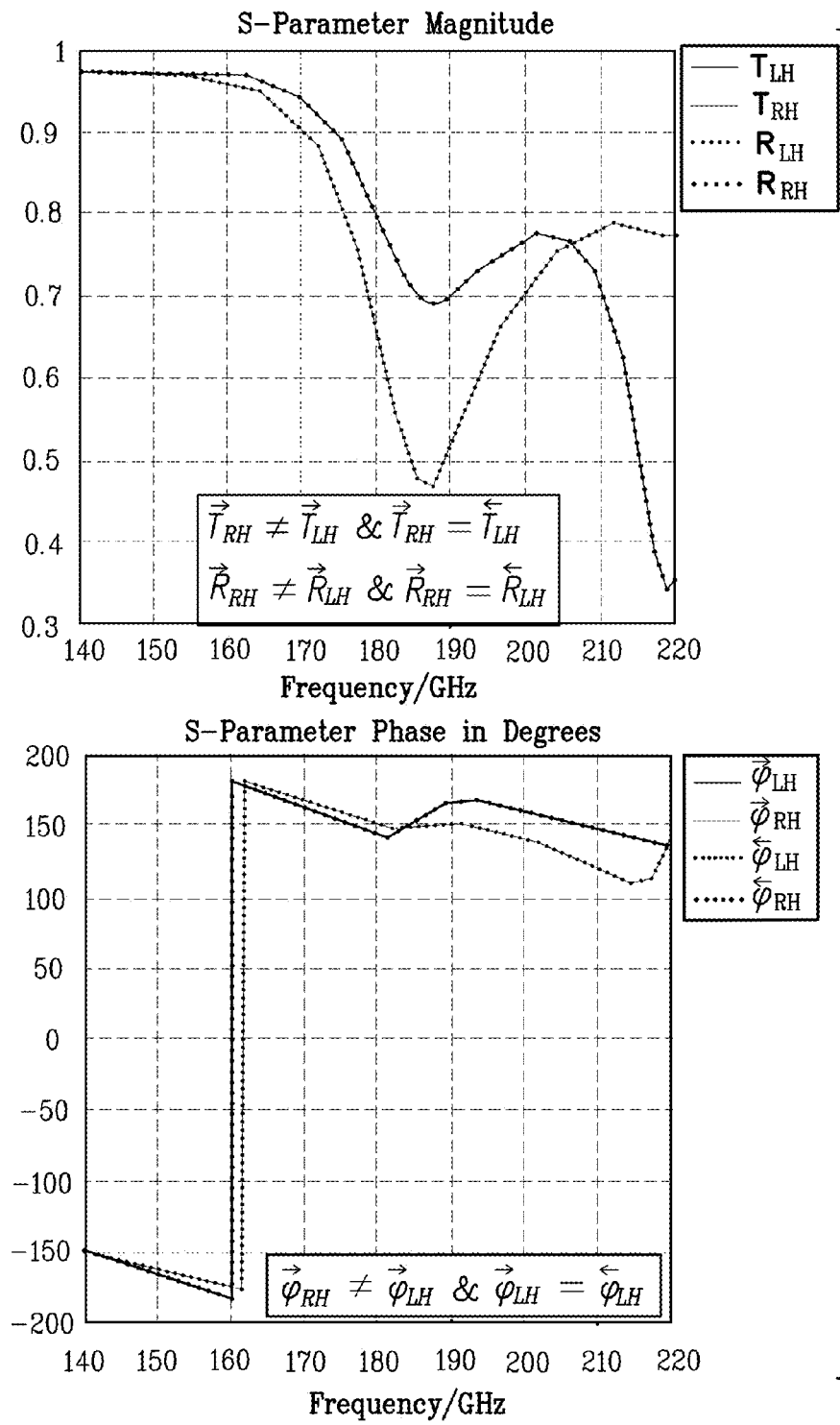
FIG. 21 shows plots of the transmission and reflection for left and right circular polarizations with incidence from the front and the back of the chiral metamaterial cube (left) and corresponding phase spectra (right).

The chiral metamaterial design was simulated using CST Microwave Studio™ to confirm the presence of the specified behavior. The field plot of electrical current on the metamaterial elements, shown in FIG. 20, verifies that the Zia elements are in fact excited by left or right circular polarized incident radiation. The Zia elements in this case already include the central rod added to the bianisotropic design, to ensure that the electric field can couple to the metal traces and generate currents. The plots on the left in FIG. 21 show the transmission and reflection for the two polarizations with incidence from the front (i.e., the +z-direction) and the back (−z-direction) of the metamaterial cube. As expected, the transmission (reflection) in the same direction differs for the left circular polarized beam as compared with the right circular polarized beam, indicating chiral behavior. Also, the transmission (reflection) with opposite incident directions for the two polarizations is the same, indicating that this metamaterial is not symmetric with respect to the left- and right-hand orientations. Similar behavior is seen for in the plots of the phase for the transmitted and reflected beams, shown on the right in FIG. 21, confirming that it is indeed a chiral material.

Design of a Biaxial Metamaterial

Figure 22:
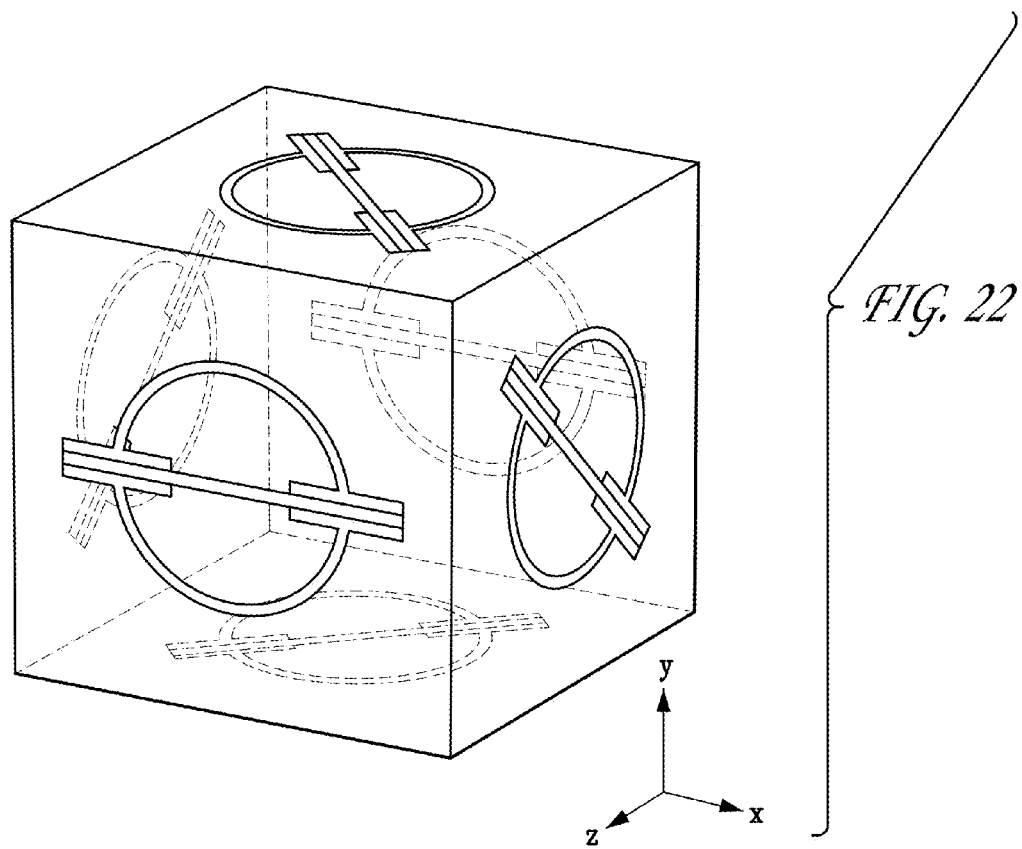
FIG. 22 shows the character table of the $D_{2h}$ group, a symmetry group that fits the necessary specifications for a biaxial metamaterial, and a corresponding element design based on the Zia ring.

As a final example, another metamaterial having electromagnetic tensor corresponding to a biaxial, or trirefringent, material can be designed. In such a material, the index of refraction experienced by an incoming beam of light depends on the angle of incidence and state of polarization of the beam, with three independent values possible. An example electromagnetic constitutive tensor for a biaxial material is given in Eq. (6), which corresponds to a symmetry group having at least 2 $r_i$ modes and two $R_i$ modes, in this case $r_x$, $r_y$, $R_x$, and $R_y$, all of which must be independent. A symmetry point group corresponding to this behavior is $D_{2h}$, as shown on the left in FIG. 22.

$$\begin{bmatrix} \bar{\bar{\varepsilon}} & \bar{\bar{\xi}} \\ \bar{\bar{\zeta}} & \bar{\bar{\mu}} \end{bmatrix} = \begin{bmatrix} \varepsilon_{xx} & 0 & 0 & 0 & 0 & 0 \\ 0 & \varepsilon_{yy} & 0 & 0 & 0 & 0 \\ 0 & 0 & 1 & 0 & 0 & 0 \\ 0 & 0 & 0 & \mu_{xx} & 0 & 0 \\ 0 & 0 & 0 & 0 & \mu_{yy} & 0 \\ 0 & 0 & 0 & 0 & 0 & 1 \end{bmatrix}. \quad (6)$$

The design of this metamaterial element again begins with the exemplary Zia element. Following the decision chart shown in FIG. 19, an element is desired that belongs to neither a low nor high symmetry group and has one or more rotational axes perpendicular to its $C_2$ axis, thus making it a D group. As with the previous designs, a cube element topology is desired here, which again requires breaking the $C_3$ axis symmetries by placing the Zia elements on the six faces of a cube and then rotating the Zia rings on the faces perpendicular to the x- and y-directions by 45° (any value between 0° and 90° can be chosen for this angle) in alternating directions, as shown on the right in FIG. 22. However, diverging from the previous design described above, a horizontal mirror plane to satisfy the $D_{2h}$ group symmetry requirements is desired, which is already accomplished by the basic Zia design. Aligning each opposing Zia pair as shown on the right in FIG. 22 ensures that all desired rotational axes and mirror planes are preserved. Once again, in a similar manner to the calculation performed previously, the resulting reducible representation of this metamaterial element can be determined as $\Gamma = 3A_g + 5(B_{1g} + B_{2g} + B_{3g}) + 4$ ($B_{1u}+B_{2u}+B_{3u}$), which clearly contains all of the B modes that necessary to enable biaxial behavior.

Figure 23:
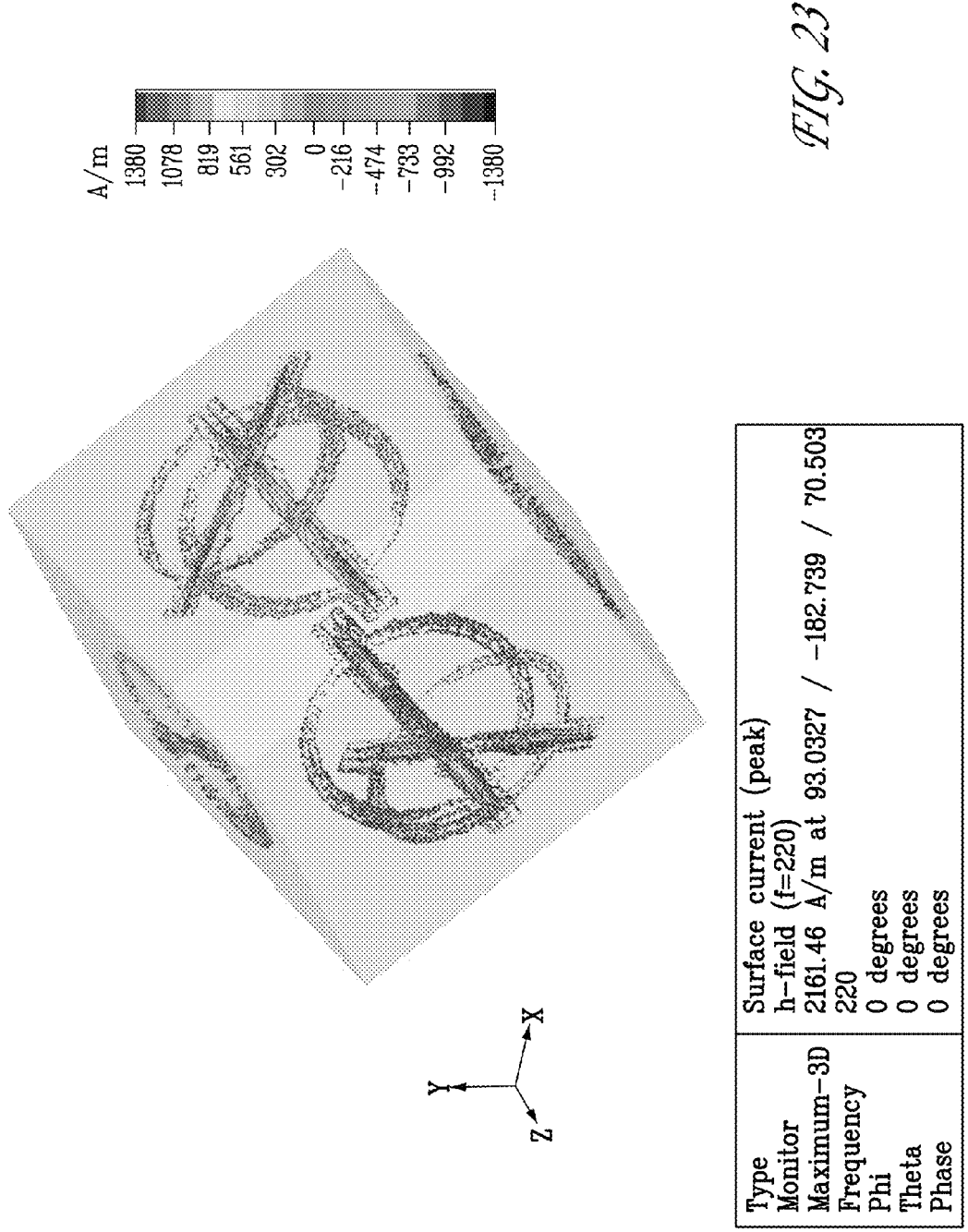
FIG. 23 shows a field plot of electrical current on the biaxial metamaterial elements, verifying that the Zia elements are in fact excited linearly polarized incident radiation.
Figure 24A:
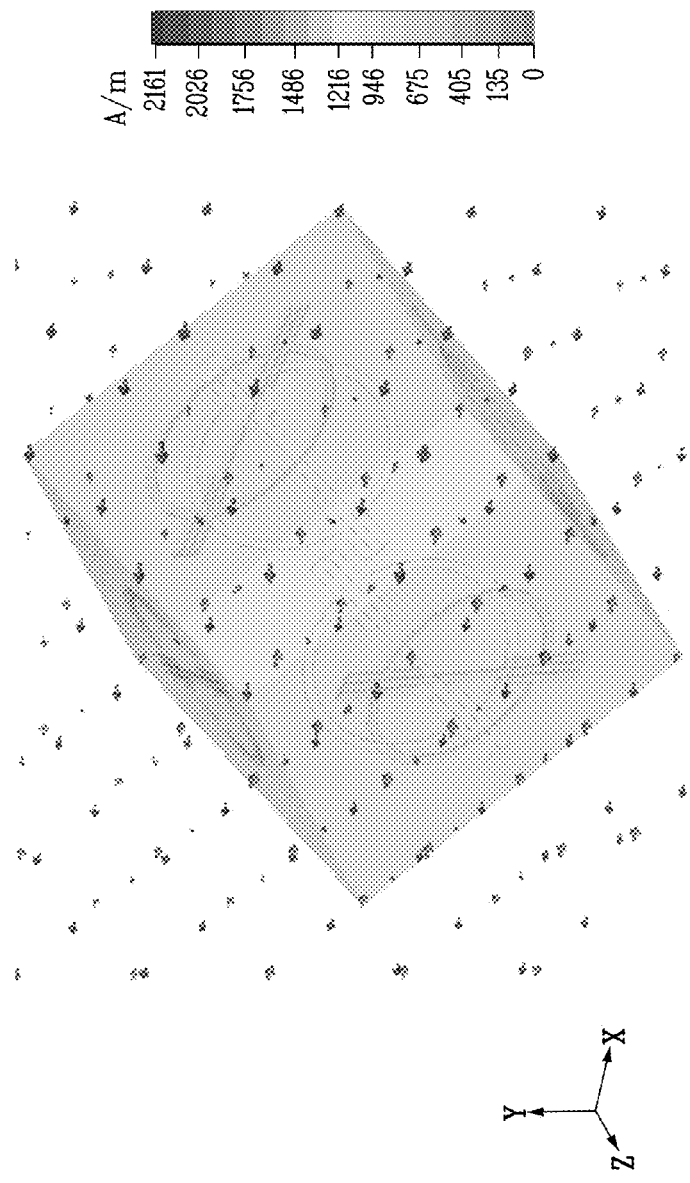
Figure 24B:
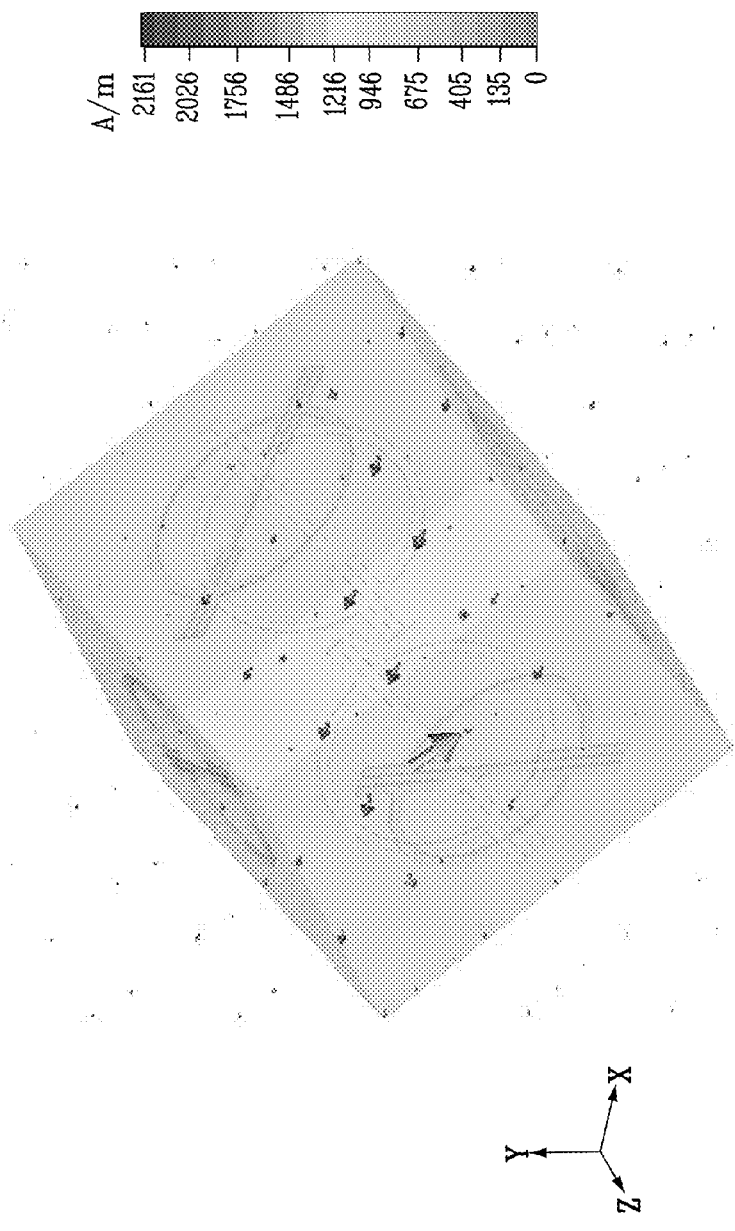
Figure 24C:
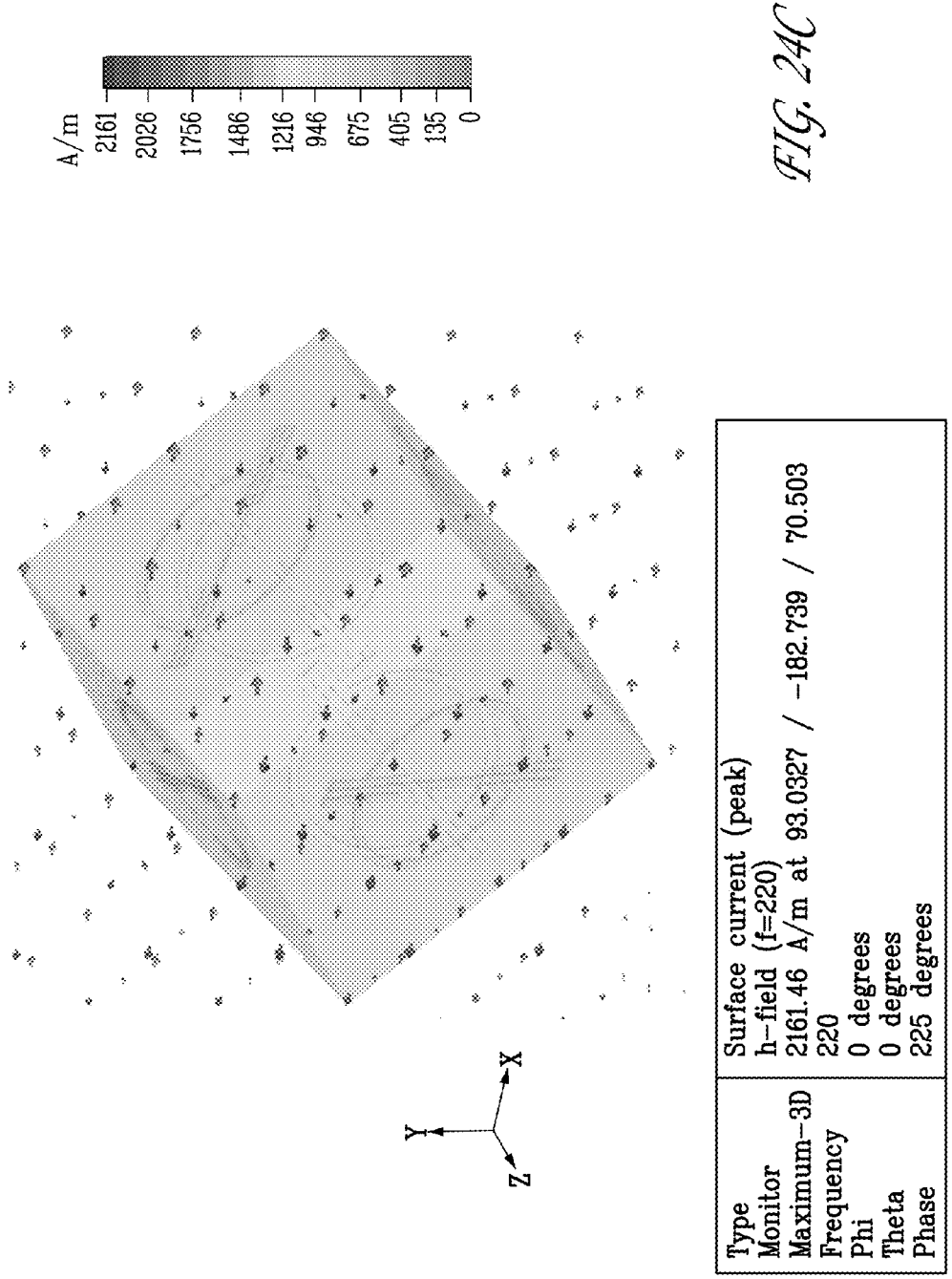

Finally, the biaxial metamaterial design was simulated to verify the specified behavior. The field plot of electrical current on the metamaterial elements, shown in FIG. 23, verifies that the Zia elements are in fact excited by linearly polarized incident radiation. In such a material, an incident beam from the + or −z-direction that is linearly polarized with the polarization aligned with the principle axes of the material will maintain its state of polarization but experience a different refractive index depending on the principle axis of the material to which it is aligned. However, if the polarization is aligned at an angle between the principle axes, the incident linear polarized light will leave the material with an altered polarization state after propagation through it, exiting with generally elliptical polarization. This change of polarization can be observed in FIGS. 24A-D, where the field vectors of the beam exiting the metamaterial under linearly polarized incident radiation can be seen to be rotating during each cycle of the electromagnetic oscillation, indicating elliptical polarization and hence biaxial behavior of the material.

Catalog of Electromagnetic Behaviors by Symmetry Group

The following table presents all 48 symmetry groups, listing the categories of electromagnetic tensors that can be engineered and realized subject to the activity of the designated modes of each character table.

TABLE 3

List of symmetry groups and their corresponding electromagnetic behaviors subject to the activity of the designated modes

| Group | Active Modes | Behavior |
|---|---|---|
| $C_1$ | A | unspecified |
| $C_s$ | A', A" | general bianisotropic |
| $C_i$ | $A_g$, $A_u$ | biaxial |
| $C_2$ | A | chiral |
|  | B | bianisotropic |
| $C_3$ | A | chiral |
|  | E | general bianisotropic |
| $C_4$ | A | chiral |
|  | B | unspecified |
|  | E | general bianisotropic |
| $C_5$ | A | chiral |
|  | $E_1$ | general bianisotropic |
|  | $E_2$ | unspecified |
| $C_6$ | A | chiral |
|  | B, $E_2$ | unspecified |
|  | $E_1$ | general bianisotropic |
| $C_7$ | A | chiral |
|  | $E_1$ | general bianisotropic |
|  | $E_2$, $E_3$ | unspecified |
| $C_8$ | A | chiral |
|  | B, $E_2$, $E_3$ | unspecified |
|  | $E_1$ | general bianisotropic |
| $C_{2v}$ | $A_1$, $A_2$ | uniaxial |
|  | $B_1$, $B_2$ | bianisotropic |
| $C_{3v}$ | $A_1$, $A_2$ | uniaxial |
|  | E | general bianisotropic |
| $C_{4v}$ | $A_1$, $A_2$ | uniaxial |
|  | $B_1$, $B_2$ | unspecified |
|  | E | general bianisotropic |
| $C_{5v}$ | $A_1$, $A_2$ | uniaxial |
|  | $E_1$ | general bianisotropic |
|  | $E_2$ | unspecified |
| $C_{6v}$ | $A_1$, $A_2$ | uniaxial |
|  | $B_1$, $B_2$, $E_2$ | unspecified |
|  | $E_1$ | general bianisotropic |

TABLE 3-continued

List of symmetry groups and their corresponding electromagnetic behaviors subject to the activity of the designated modes

| Group | Active Modes | Behavior |
|---|---|---|
| $C_{2h}$ | $A_g$, $A_u$ | uniaxial |
|  | $B_g$, $B_u$ | biaxial |
| $C_{3h}$ | A', A" | uniaxial |
|  | E', E" | general anisotropic |
| $C_{4h}$ | $A_g$, $A_u$ | uniaxial |
|  | $B_g$, $B_u$ | unspecified |
|  | $E_g$, $E_u$ | general anisotropic |
| $C_{5h}$ | A', A" | uniaxial |
|  | $E_1'$, $E_1"$ | general anisotropic |
|  | $E_2'$, $E_2"$ | unspecified |
| $C_{6h}$ | $A_g$, $A_u$ | uniaxial |
|  | $B_g$, $B_u$, $E_{2g}$, $E_{2u}$ | unspecified |
|  | $E_{1g}$, $E_{1u}$ | general anisotropic |
| $D_2$ | A | unspecified |
|  | $B_1$, $B_2$, $B_3$ | chiral |
| $D_3$ | $A_1$ | unspecified |
|  | $A_2$ | chiral |
|  | E | general bianisotropic |
| $D_4$ | $A_1$, $B_1$, $B_2$ | unspecified |
|  | $A_2$ | chiral |
|  | E | general bianisotropic |
| $D_5$ | $A_1$, $E_2$ | unspecified |
|  | $A_2$ | chiral |
|  | $E_1$ | general bianisotropic |
| $D_6$ | $A_1$, $B_1$, $B_2$, $E_1$ | unspecified |
|  | $A_2$ | chiral |
|  | $E_2$ | general bianisotropic |
| $D_{2d}$ | $A_1$, $B_1$ | unspecified |
|  | $A_2$, $B_2$ | uniaxial |
|  | E | general bianisotropic |
| $D_{3d}$ | $A_{1g}$, $A_{1u}$ | unspecified |
|  | $A_{2g}$, $A_{2u}$ | uniaxial |
|  | $E_g$, $E_u$ | general anisotropic |
| $D_{4d}$ | $A_1$, $B_1$, $E_2$ | unspecified |
|  | $A_2$, $B_2$ | uniaxial |
|  | $E_1$, $E_3$ | general bianisotropic |
| $D_{5d}$ | $A_{1g}$, $E_{2g}$, $A_{1u}$, $E_{2u}$ | unspecified |
|  | $A_{2g}$, $A_{2u}$ | uniaxial |
|  | $E_{1g}$, $E_{1u}$ | general anisotropic |
| $D_{6d}$ | $A_1$, $B_1$, $E_2$, $E_3$, $E_4$ | unspecified |
|  | $A_2$, $B_2$ | uniaxial |
|  | $E_1$, $E_5$ | general bianisotropic |
| $D_{2h}$ | $A_g$, $A_u$ | unspecified |
|  | $B_{1g}$, $B_{2g}$, $B_{3g}$, $B_{1u}$, $B_{2u}$, $B_{3u}$ | uniaxial, biaxial |
| $D_{3h}$ | $A_1'$, $A_1"$ | unspecified |
|  | $A_2'$, $A_2"$ | uniaxial |
|  | E', E" | general anisotropic |
| $D_{4h}$ | $A_{1g}$, $B_{1g}$, $B_{2g}$, $A_{1u}$, $B_{1u}$, $B_{2u}$ | unspecified |
|  | $A_{2g}$, $A_{2u}$ | uniaxial |
|  | $E_g$, $E_u$ | general anisotropic |
| $D_{5h}$ | $A_1'$, $A_1"$, $E_1'$, $E_1"$ | unspecified |
|  | $A_2'$, $A_2"$ | uniaxial |
|  | $E_1'$, $E_1"$ | general anisotropic |
| $D_{6h}$ | $A_{1g}$, $B_{1g}$, $B_{2g}$, $E_{2g}$, $A_{1u}$, $B_{1u}$, $B_{2u}$, $E_{2u}$ | unspecified |
|  | $A_{2g}$, $A_{2u}$ | uniaxial |
|  | $E_{1g}$, $E_{1u}$ | general anisotropic |
| $D_{8h}$ | $A_{1g}$, $B_{1g}$, $B_{2g}$, $E_{2g}$, $E_{3g}$, $A_{1u}$, $B_{1u}$, $B_{2u}$, $E_{2u}$, $E_{3u}$ | unspecified |
|  | $A_{2g}$, $A_{2u}$ | uniaxial |
|  | $E_{1g}$, $E_{1u}$ | general anisotropic |
| $C_{\infty v}$ | $A_1$, $A_2$ | uniaxial |
|  | $E_1$ | bianisotropic |
|  | $E_2$, $E_3$, ... | unspecified |
| $D_{\infty h}$ | $A_{1g}$, $E_{2g}$, $A_{2u}$, $E_{2u}$, ... | unspecified |
|  | $A_{2g}$, $A_{1u}$ | uniaxial |
|  | $E_{1g}$, $E_{1u}$ | general anisotropic |
| $S_4$ | A, B | uniaxial |
|  | E | bianisotropic |
| $S_6$ | $A_g$, $A_u$ | uniaxial |
|  | $E_g$, $E_u$ | general anisotropic |

TABLE 3-continued

List of symmetry groups and their corresponding electromagnetic behaviors subject to the activity of the designated modes

| Group | Active Modes | Behavior |
|---|---|---|
| $S_8$ | A, B | uniaxial |
|  | $E_1$ | bianisotropic |
|  | $E_2, E_3$ | unspecified |
| T | A, E | unspecified |
|  | T | general bianisotropic |
| $T_d$ | $A_1, A_2, E$ | unspecified |
|  | $T_1, T_2$ | general anisotropic |
| $T_h$ | $A_g, A_u, E_g, E_u$ | unspecified |
|  | $T_g, T_u$ | general anisotropic |
| O | $A_1, A_2, E, T_2$ | unspecified |
|  | $T_1$ | general bianisotropic |
| $O_h$ | $A_{1g}, A_{2g}, E_g, T_{2g},$ $A_{1u}, A_{2u}, E_u, T_{2u}$ | unspecified |
|  | $T_{1g}, T_{1u}$ | general anisotropic |
| I | $A, T_2, G, H$ | unspecified |
|  | $T_1$ | general bianisotropic |
| $I_h$ | $A_g, T_{2g}, G_g, H_g,$ $A_u, T_{2u}, G_g, H_g$ | unspecified |
|  | $T_{1g}, T_{1u}$ | general anisotropic |

The present invention has been described as metamaterials with tailorable electromagnetic properties and methods to design such metamaterials. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A circular bianisotropic metamaterial, comprising:
   a first electrically conducting planar double-split circular ring comprising a first circular ring with two diametrically opposed splits and a bisecting rod through the center of the first circular ring that bisects the opposing splits;
   a second electrically conducting planar double-split circular ring comprising a second circular ring with two diametrically opposed splits and a bisecting rod through the center of the second circular ring that bisects the opposing splits; and
   a capacitive arm intersecting the first circular ring at each of the two diametrically opposed splits, wherein each intersecting capacitive arm comprises two opposed fingers parallel to and on opposite sides of the bisecting rod, and wherein each opposed finger is separated from the bisecting rod by a gap: and a capacitive arm intersecting the second circular ring at each of the two diametrically opposed splits, wherein each intersecting capacitive arm comprises two opposed fingers parallel to and on opposite sides of the bisecting rod, and wherein each opposing finger is separated from the bisecting rod by a gap; and
   wherein the first and second circular rings are concentric and spaced apart from each other on parallel planes, and wherein the bisecting rod of the first circular ring is rotated by an angle of 90° with respect to the bisecting rod of the second circular ring, thereby providing a circular bianisotropic metamaterial with $C_{2v}$ symmetry.

2. The circular bianisotropic metamaterial of claim 1, wherein the first and second circular rings have diameters of different lengths.

3. A square bianisotropic metamaterial, comprising:
   a first electrically conducting planar double-split square loop comprising a first square loop with two opposed splits bisecting opposite sides of the square loop and a bisecting rod through the center of the square loop that bisects the opposed splits;
   a second electrically conducting planar double-split square loop comprising a second square loop with two opposed splits bisecting opposite sides of the square loop and a bisecting rod through the center of the square loop that bisects the opposed splits; and
   a capacitive arm intersecting the first square loop at each of the two opposed splits, wherein each intersecting capacitive arm comprises two opposed fingers parallel to and on opposite sides of the bisecting rod, and wherein each opposed finger is separated from the bisecting rod by a gap; and a capacitive arm intersecting the second square loop at each of the two opposed splits, wherein each intersecting capacitive arm comprises two opposed fingers parallel to and on opposite sides of the bisecting rod, wherein each opposed finger is separated from the bisecting rod by a gap; and
   wherein the first and second square loops are concentric and spaced apart from each other on parallel planes, and wherein the bisecting rod of the first square loop is rotated by an angle of 90° with respect to the bisecting rod of the second square loop, thereby providing a square bianisotropic metamaterial with $C_{2v}$ symmetry.

4. The square bianisotropic metamaterial of claim 3, wherein the first and second square loops have sides of different length.

* * * * *